(12) United States Patent
Boon et al.

(10) Patent No.: US 7,634,148 B2
(45) Date of Patent: Dec. 15, 2009

(54) IMAGE SIGNAL TRANSFORMING AND INVERSE-TRANSFORMING METHOD AND COMPUTER PROGRAM PRODUCT WITH PRE-ENCODING FILTERING FEATURES

(75) Inventors: Choong Seng Boon, Yokohama (JP); Thiow Keng Tan, Singapore (SG)

(73) Assignee: NTT DoCoMo, Inc., Tokyo (JP)

( * ) Notice: Subject to any disclaimer, the term of this patent is extended or adjusted under 35 U.S.C. 154(b) by 557 days.

(21) Appl. No.: 11/317,014

(22) Filed: Dec. 27, 2005

(65) Prior Publication Data

US 2006/0193529 A1    Aug. 31, 2006

(30) Foreign Application Priority Data

Jan. 7, 2005    (JP) ............................. P2005-002995
May 13, 2005    (JP) ............................. P2005-141669

(51) Int. Cl.
*G06K 9/36* (2006.01)
*G06K 9/40* (2006.01)
*G06K 9/46* (2006.01)

(52) U.S. Cl. ..................... 382/248; 382/251; 382/260

(58) Field of Classification Search ................. 382/173, 382/232, 233, 236, 238, 242, 244, 247, 248, 382/260–264, 305, 251; 375/240.12, 240.13, 375/240.16, 240.18, 240.25, E7.03, E7.093, 375/E7.193; 348/400.1, 401.1, E7.073, E7.074; 358/426.02

See application file for complete search history.

(56) References Cited

U.S. PATENT DOCUMENTS

| 5,005,076 | A | * | 4/1991 | Stroppina et al. | ........ | 348/400.1 |
|---|---|---|---|---|---|---|
| 5,196,946 | A | | 3/1993 | Balkanski et al. | | |
| 5,235,420 | A | * | 8/1993 | Gharavi | .................. | 375/240.11 |
| 5,253,058 | A | * | 10/1993 | Gharavi | .................. | 375/240.12 |
| 5,426,673 | A | * | 6/1995 | Mitra et al. | .................. | 375/241 |
| 5,469,517 | A | * | 11/1995 | Ohta | ........................... | 382/252 |
| 5,491,515 | A | * | 2/1996 | Suzuki | .................... | 348/401.1 |

(Continued)

FOREIGN PATENT DOCUMENTS

CN    1514651 A    7/2004

(Continued)

OTHER PUBLICATIONS

Kenneth Rose, et al., "DCT/DST Alternate-Transform Image Coding", IEEE Transactions on Communications, vol. 38, No. 1, Jan. 1990, pp. 94-101.

(Continued)

*Primary Examiner*—Amir Alavi
(74) *Attorney, Agent, or Firm*—Oblon, Spivak, McClelland, Maier & Neustadt, L.L.P.

(57) ABSTRACT

An aspect of an image signal transforming method is a method of generating one or more transformed samples from a plurality of input samples, which includes a first transformed sample generating step of performing a first filtering process by a filter, on at least one first input sample (an input sample from a terminal) out of a plurality of first input samples used for generation of a first transformed sample, to generate first filtered data, and performing a first arithmetic process (subtraction by a subtractor) on another first input sample not used for the generation of the first filtered data (an input sample from another terminal), and the first filtered data generated, to generate the first transformed sample.

19 Claims, 22 Drawing Sheets

U.S. PATENT DOCUMENTS

| | | | |
|---|---|---|---|
| 5,542,008 | A | 7/1996 | Sugahara et al. |
| 5,644,658 | A | 7/1997 | Sugahara et al. |
| 5,781,788 | A * | 7/1998 | Woo et al. .................. 712/1 |
| 5,917,954 | A * | 6/1999 | Girod et al. ............. 382/248 |
| 6,360,200 | B1 * | 3/2002 | Edler et al. ............. 704/219 |
| 6,574,278 | B1 * | 6/2003 | McVeigh et al. ...... 375/240.18 |
| 6,606,419 | B2 * | 8/2003 | Nakaya .................. 382/251 |
| 6,631,162 | B1 * | 10/2003 | Lee et al. ............ 375/240.16 |
| 7,242,717 | B2 * | 7/2007 | Li et al. ............. 375/240.18 |
| 2001/0012405 | A1 * | 8/2001 | Hagai et al. ............. 382/242 |
| 2003/0099291 | A1 | 5/2003 | Kerofsky |
| 2005/0047508 | A1 * | 3/2005 | Ha et al. ............ 375/240.16 |
| 2006/0193529 | A1 * | 8/2006 | Boon et al. ............. 382/248 |

FOREIGN PATENT DOCUMENTS

| | | |
|---|---|---|
| JP | 5-183889 | 7/1993 |
| JP | 07-284099 | 10/1995 |
| JP | 8-294125 | 11/1996 |
| JP | 2000-40943 | 2/2000 |
| JP | 2003-284078 | 10/2003 |
| JP | 2005-39798 | 2/2005 |

OTHER PUBLICATIONS

Manfred Tasto, et al., "Image Coding by Adaptive Block Quantization", IEEE Transactions on Communicaiton Technology, vol. com-19, No. 6, Dec. 1971, pp. 957-972.

Luc Vandendorpe, et al., "An Adaptive Transform approach for Image Compression", IEEE Digital Signal Processing Workshop Proceedings, Sep. 1-4, 1996, pp. 41-44.

Jens-Rainer Ohm, "Complexity and Delay Analysis of MCTF Interframe Wavelet Structures", ISO/IEC JTC1/SC29/WG11 MPEG02/M8520, XP 002282535, Jul. 2002, 16 Pages.

A. Secker, et al., "Lifting-Based Invertible Motion Adaptive Transform (LIMAT) Framework for Highly Scalable Video Compression", IEEE Transactions on Image Processing, XP 011105316, vol. 12, No. 12, Dec. 2003, pp. 1530-1542.

L. Thornton, et al., "Perceptually Weighted Wavelet-Based Codec for Handheld Videophone Applications", Electronics Letters, XP 006018562, vol. 38, No. 15, Jul. 18, 2002, 2 Pages.

L. H. Sibul, et al., "Generalized Wavelet Transforms and Their Applications", Proceedings of the SPIE, XP 001012027, vol. 3391, Apr. 14, 1998, pp. 502-509.

A. Mavlankar, et al., "A New Update Step for Reduction of PSNR Fluctuations in Motion-Compensated Lifted Wavelet Video Coding", Multimedia Signal Processing, XP 002448716, Oct. 2005, 4 Pages.

"Formal development and convergence analysis of the parallel adaptive mixed transform algorithm", Berg, A.P., et al, Proceedings of 1997 IEEE International Symposium on circuits and systems, 1997. ISCAS '97., Hong Kong Jun. 9-12, 1997, New York, NY, USA, IEEE, US, vol. 4, ISBN: 978-0-7803-3583-7, Jun. 9, 1997, p. 2280-p. 2283, XP010236181.

"Perceptual activity measures computed from blocks in the transform domain", Lee, Yu-Hwe, et al., Signal Processing, Elseview Science Publishers B.V. Amsterdam, NL, vol, 82, No. 4, ISSN: 0165-1684, Apr. 1, 2002, p. 693-p. 707, XP004349788.

* cited by examiner

Fig.18

$$T = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \sim 1801$$

$$T_{inv} = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \sim 1802$$

$$U = \begin{bmatrix} 1/4 & 0 & 0 & 0 \\ 0 & 1/5 & 0 & 0 \\ 0 & 0 & 1/4 & 0 \\ 0 & 0 & 0 & 1/5 \end{bmatrix} \sim 1803$$

Fig.19

$$T_w = \begin{bmatrix} 1 & 2-w_4 & (2-w_2)(2-w_4) & 2-w_1 \\ 2 & 5-4w_3 & -(5-4w_3)w_2 & -2w_1 \\ 1 & -w_4 & (w_2-2)w_4 & 2-w_1 \\ 1 & -2w_3 & 2w_2w_3 & -w_1 \end{bmatrix} \sim 1901$$

$$T_{winv} = \begin{bmatrix} w_1w_4 & (2-w_1)w_3 & w_1(2-w_4) & \tfrac{1}{2}(5-4w_3) \\ w_2 & (2-\tfrac{1}{2}w_2) & -w_2 & w_2-1 \\ 1 & -\tfrac{1}{2} & -1 & 1 \\ w_4 & -w_3 & 2-w_4 & -\tfrac{1}{2}(5-4w_3) \end{bmatrix} \sim 1902$$

$$U = \begin{bmatrix} 1/4 & 0 & 0 & 0 \\ 0 & 1/5 & 0 & 0 \\ 0 & 0 & 1/4 & 0 \\ 0 & 0 & 0 & 1/5 \end{bmatrix} \sim 1903$$

IMAGE SIGNAL TRANSFORMING AND INVERSE-TRANSFORMING METHOD AND COMPUTER PROGRAM PRODUCT WITH PRE-ENCODING FILTERING FEATURES

BACKGROUND OF THE INVENTION

1. Field of the Invention

The present invention relates to image signal transforming method, image signal inversely-transforming method, image encoding apparatus, image encoding method, image encoding program, image decoding apparatus, image decoding method, and image decoding program.

2. Related Background Art

Conventionally, the compressive coding techniques are used for efficiently performing transmission and storage of still image and moving image data. Particularly, MPEG (Moving Picture Experts Group) 1, 2, and 4 and H.261-H.264 systems are used in the case of moving images, and JPEG (Joint Photographic Experts Group) and JPEG2000 are used in the case of still images.

In most of these coding systems, an image as an object for coding is decomposed into a plurality of blocks and the discrete cosine transform (hereinafter referred to as "DCT") is applied to transform each block itself or a differential signal between the block and a prediction signal for the block, into data in the frequency domain. The transformation coefficients obtained by the transformation are quantized to compress the data volume of the signal of the original image. In reconstruction, the compressed data is dequantized into a signal of each block, and the inverse discrete cosine transform (hereinafter referred to as "IDCT") is applied to restore a signal or differential signal in the pixel domain. The coding using DCT is described, for example, in U.S. Pat. No. 5,196,946.

FIG. 1 is a block diagram showing the DCT process according to the conventional technology. This example corresponds to a case where four pixels are transformed into data in the frequency domain. Four pixels a0, a1, a2, and a3 are supplied via respective input terminals 101-104. Adder 113 adds a0 and a3 and subtractor 114 obtains a difference between a0 and a3. Similarly, a1 and a2 are processed by adder 115 and subtractor 116. These results are fed via respective terminals 105-108 to the next stage. The signals from terminals 105 and 106 are processed by adder 117 and subtractor 118, and the signals from terminals 107 and 108 by adder 119, subtractor 120, and multipliers 121 and 122. Results obtained in this manner are coefficients in the frequency domain and outputted via terminals 109-112.

FIG. 2 is a block diagram showing the IDCT process according to the conventional technology. Coefficients in the frequency domain are imported via respective input terminals 201-204. The coefficients from terminals 201 and 202 are processed by adder 213 and subtractor 214, and the coefficients from terminals 203 and 204 by subtractor 215, adder 216, and multipliers 221 and 222. Signals obtained in this manner are fed via terminals 205-208 to the next stage. The signals from terminals 205 and 208 are processed by adder 217 and subtractor 218, and the signals from terminals 206 and 207 by adder 219 and subtractor 220. In this manner the coefficients in the frequency domain are inversely transformed into the original pixels a0, a1, a2, and a3 and they are outputted from respective terminals 209-212.

As described above, the encoding apparatus is able to express an input signal in a compact form through the transformation of the image into the frequency domain and thus to achieve efficient coding.

SUMMARY OF THE INVENTION

However, since the conventional transformation method is to transform signals as objects for transformation by one type of transformation system, it is difficult to realize concentration of energy exceeding the original characteristics of the signals as objects for transformation. Namely, where there is a high correlation between signals as objects, the concentration of energy will be high enough to achieve efficient coding, but, where the original correlation between signals is low, coefficients by DCT will spread over a wide range in the frequency domain. In consequence, it is difficult to achieve efficient coding.

In general, signals of taken still images and moving images demonstrate a high correlation and thus can be efficiently encoded by use of DCT. In contrast to it, in the case where a difference is taken between a prediction signal obtained by intra-frame prediction or inter-frame prediction and an image signal as an object for coding, the correlation of the differential signal is not so high. Therefore, it is difficult to express the differential signal in a compact form even with the use of DCT.

An object of the present invention is to solve the above problem and thereby to provide image signal transforming method, image signal inversely-transforming method, image encoding apparatus, image encoding method, image encoding program, image decoding apparatus, image decoding method, and image decoding program capable of efficiently expressing a signal by concentration of energy of the signal even in the case where the correlation of the signal as an object for transformation is not high.

In order to achieve the above object, an image signal transforming method according to the present invention is an image signal transforming method of generating one or more transformed samples from a plurality of input samples, comprising: a first transformed sample generating step of performing a first filtering process on at least one first input sample out of a plurality of first input samples used for generation of a first transformed sample, to generate first filtered data, and performing a first arithmetic process on another first input sample not used for the generation of the first filtered data, and said first filtered data generated, to generate the first transformed sample.

The present invention involves performing the predetermined filtering on the signal as an object, and thereby provides the effect of capability of realizing concentration of energy exceeding the original characteristic of the signal and efficiently encoding the signal.

The image signal transforming method according to the present invention can be applied to either of the transformation process and inverse transformation process in an image encoding apparatus described hereinafter and can also be applied to either of the transformation process and inverse transformation process in an image decoding apparatus described hereinafter.

The image signal transforming method preferably further comprises a second transformed sample generating step of performing a second filtering process on the first transformed sample generated in the first transformed sample generating step, to generate second filtered data, and performing a second arithmetic process on at least one second input sample used for generation of a second transformed sample, and said second filtered data generated, to generate the second transformed sample.

The image signal transforming method preferably further comprises a second transformed sample generating step of performing a second filtering process on at least one second input sample out of a plurality of second input samples used for generation of a second transformed sample, to generate second filtered data, and performing a second arithmetic process on another second input sample not used for the generation of the second filtered data, and said second filtered data generated, to generate the second transformed sample.

An image encoding apparatus according to the present invention is an image encoding apparatus comprising: importing means for importing an input image as an object for coding; region decomposing means for decomposing the input image imported by the importing means, into a plurality of coding regions; predicting means for obtaining a differential signal by either intra-frame prediction or inter-frame prediction, for each of the coding regions resulting from the decomposition by the region decomposing means, and for generating the obtained differential signal as a transformation object signal; transforming means for generating a transformed sample, using the transformation object signal generated by the predicting means, as an input sample, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and for defining the generated transformed sample as a transformation coefficient, thereby transforming the transformation object signal into the transformation coefficient; and encoding means for encoding the transformation coefficient obtained by the transforming means.

In the image encoding apparatus, preferably, the transforming means selects and uses a filter to maximize a correlation of the transformation object signal, out of plural types of filters in the filtering process, and further encodes identification information for identification of the selected filter.

An image decoding apparatus according to the present invention is an image decoding apparatus comprising: importing means for importing compressed data generated by performing either intra-frame prediction or inter-frame prediction, for an image decomposed into a plurality of regions, and performing transformation and coding; decoding means for restoring transformation coefficients corresponding to said respective regions from the compressed data imported by the importing means, and for generating the resultant transformation coefficients as restored transformation coefficients; and inversely transforming means for generating a transformed sample, using the restored transformation coefficients generated by the decoding means, as input samples, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and for defining the generated transformed sample as inversely transformed data, thereby transforming the restored transformation coefficients into the inversely transformed data.

In the image decoding apparatus, preferably, the compressed data contains filter identification information for identification of a filter used in the filtering process, and the decoding means decodes the filter identification information and performs the filtering process using the filter corresponding to the decoded filter identification information.

An image encoding method according to the present invention is an image encoding method comprising: an importing step of importing an input image as an object for coding; a region decomposing step of decomposing the input image imported in the importing step, into a plurality of coding regions; a predicting step of obtaining a differential signal by either intra-frame prediction or inter-frame prediction, for each of the coding regions resulting from the decomposition in the region decomposing step, and generating the obtained differential signal as a transformation object signal; a transforming step of generating a transformed sample, using the transformation object signal generated in the predicting step, as an input sample, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and defining the generated transformed sample as a transformation coefficient, thereby transforming the transformation object signal into the transformation coefficient; and an encoding step of encoding the transformation coefficient obtained in the transforming step.

An image decoding method according to the present invention is an image decoding method comprising: an importing step of importing compressed data generated by performing either intra-frame prediction or inter-frame prediction, for an image decomposed into a plurality of regions, and performing transformation and coding; a decoding step of restoring transformation coefficients corresponding to said respective regions from the compressed data imported in the importing step, and generating the resultant transformation coefficients as restored transformation coefficients; and an inversely transforming step of generating a transformed sample, using the restored transformation coefficients generated in the decoding step, as input samples, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and defining the generated transformed sample as inversely transformed data, thereby transforming the restored transformation coefficients into the inversely transformed data.

An image encoding program according to the present invention is an image encoding program for letting a computer execute the following steps: an importing step of importing an input image as an object for coding; a region decomposing step of decomposing the input image imported in the importing step, into a plurality of coding regions; a predicting step of obtaining a differential signal by either intra-frame prediction or inter-frame prediction, for each of the coding regions resulting from the decomposition in the region decomposing step, and generating the obtained differential signal as a transformation object signal; a transforming step of generating a transformed sample, using the transformation object signal generated in the predicting step, as an input sample, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and defining the generated transformed sample as a transformation coefficient, thereby transforming the transformation object signal into the transformation coefficient; and an encoding step of encoding the transformation coefficient obtained in the transforming step.

An image decoding program according to the present invention is an image decoding program for letting a computer execute the following steps: an importing step of importing compressed data generated by performing either intra-frame prediction or inter-frame prediction, for an image decomposed into a plurality of regions, and performing transformation and coding; a decoding step of restoring transformation coefficients corresponding to said respective regions from the compressed data imported in the importing step, and generating the resultant transformation coefficients as restored transformation coefficients; and an inversely transforming step of generating a transformed sample, using the restored transformation coefficients generated in the decoding step, as input samples, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data, and the first filtered data generated, to generate the first transformed sample, and defining the generated transformed sample as inversely transformed data, thereby transforming the restored transformation coefficients into the inversely transformed data.

In order to solve the above problem, another image signal transforming method according to the present invention is an image signal transforming method of generating $2^N$ transformed samples from $2^N$ (N is a natural number) input samples in accordance with a predetermined transformation rule, comprising: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples.

The present invention involves performing the predetermined weighting process on the signal as an object, whereby the signal is transformed by a transformation basis suitable for the original characteristic thereof. For this reason, it is feasible to enhance the degree of energy concentration and to achieve efficient coding of the signal.

An image signal inversely-transforming method according to the present invention is an image signal inversely-transforming method of generating $2^N$ output samples from $2^N$ (N is a natural number) transformed samples in accordance with a predetermined transformation rule, comprising: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples.

The image signal transforming method according to the present invention can also be applied to a transformation process in an image encoding apparatus. Namely, an image encoding apparatus is one comprising: importing means for importing an input image as an object for coding; region decomposing means for decomposing the input image imported by the importing means, into a plurality of coding regions; predicting means for obtaining a differential signal by either intra-frame prediction or inter-frame prediction, for each of the coding regions resulting from the decomposition by the region decomposing means, and for generating the differential signal as a transformation object signal; transforming means for generating a transformed sample, using the transformation object signal generated by the predicting means, as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples, and for defining the generated transformed sample as a transformation coefficient, thereby transforming the transformation object signal into the transformation coefficient; and encoding means for encoding the transformation coefficient obtained by the transforming means.

In the image encoding apparatus, preferably, the transforming means selects a weighting factor to maximize a degree of energy concentration of the transformation object signal, out of a plurality of weighting factors in the intermediate value generating step and in the transformation coefficient generating step, and identification information of the weighting factor is further encoded.

Another image encoding method according to the present invention is an image encoding method comprising: an importing step of importing an input image as an object for coding; a region decomposing step of decomposing the input image imported in the importing step, into a plurality of coding regions; a predicting step of obtaining a differential signal by either intra-frame prediction or inter-frame prediction, for each of the coding regions resulting from the decomposition in the region decomposing step, and generating the differential signal as a transformation object signal; a transforming step of generating a transformed sample, using the transformation object signal generated in the predicting step, as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples, and defining the generated transformed sample as a transformation coefficient, thereby transforming the transformation object signal into the transformation coefficient; and an encoding step of encoding the transformation coefficient obtained in the transforming step.

Similarly, the image signal inversely-transforming method according to the present invention can also be applied to an inverse transformation process in an image decoding apparatus. Namely, an image decoding apparatus is one comprising: importing means for importing compressed data generated by performing either intra-frame prediction or inter-frame prediction, for an image decomposed into a plurality of regions, and for performing transformation and coding; decoding means for restoring transformation coefficients corresponding to the respective regions from the compressed data imported by the importing means, and for generating the resultant transformation coefficients as restored transformation coefficients; and inversely transforming means for generating an output sample, using the restored transformation coefficients generated by the decoding means, as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and for defining the output sample as inversely transformed data, thereby transforming the restored transformation coefficients into the inversely transformed data.

In the above image decoding apparatus, preferably, the compressed data contains identification information of the weighting factor used in the intermediate value generating step or in the output value generating step, and the decoding means decodes the identification information and performs the process of the intermediate value generating step or the output value generating step, using the weighting factor corresponding to the identification information.

Another image decoding method according to the present invention is an image decoding method comprising: an importing step of importing compressed data generated by performing either intra-frame prediction or inter-frame prediction, for an image decomposed into a plurality of regions, and performing transformation and coding; a decoding step of restoring transformation coefficients corresponding to the respective regions from the compressed data imported in the importing step, and generating the resultant transformation coefficients as restored transformation coefficients; and an inversely transforming step of generating an output sample, using the restored transformation coefficients generated in the decoding step, as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and defining the output sample as inversely transformed data, thereby transforming the restored transformation coefficients into the inversely transformed data.

Furthermore, the encoding technology according to the present invention can also be applied to a program. Namely, an encoding program is an image encoding program for letting a computer execute the following processes: a process of importing an input image as an object for coding; a process of decomposing the input image imported, into a plurality of coding regions; a process of obtaining a differential signal by either intra-frame prediction or inter-frame prediction, for each of the coding regions resulting from the decomposition, and generating the differential signal as a transformation object signal; a process of generating a transformed sample, using the generated transformation object signal as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m < \leq 2^{N-1}$, m is a natural number) of intermediate values determined in accordance with the transformation rule, by an m-th weighting factor, and performing a second transformation arithmetic to generate an m-th pair of transformed samples, and defining the generated transformed sample as a transformation coefficient, thereby transforming the transformation object signal into the transformation coefficient; and a process of encoding the transformation coefficient obtained.

Similarly, a decoding program according to the present invention is an image decoding program for letting a computer execute the following processes: a process of importing compressed data generated by performing either intra-frame prediction or inter-frame prediction, for an image decomposed into a plurality of regions, and performing transformation and coding; a process of restoring transformation coefficients corresponding to the respective regions from the compressed data imported, and generating the resultant transformation coefficients as restored transformation coefficients; and a process of generating an output sample, using the restored transformation coefficients as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and defining the output sample as inversely transformed data, thereby transforming the restored transformation coefficients into the inversely transformed data.

As described above, the present invention provides the effect of capability of realizing the concentration of energy exceeding the original characteristic of the signal and achieving efficient coding of the signal.

BRIEF DESCRIPTION OF THE DRAWINGS

FIG. 18 is an illustration showing an example of conventional matrices for performing transformation and inverse transformation.

FIG. 19 is an illustration showing an example of matrices according to the present invention for carrying out transformation and inverse transformation.

DESCRIPTION OF THE PREFERRED EMBODIMENTS

First Embodiment

The first embodiment of the present invention will be described below using FIGS. 3 to 15.

Figure 3:
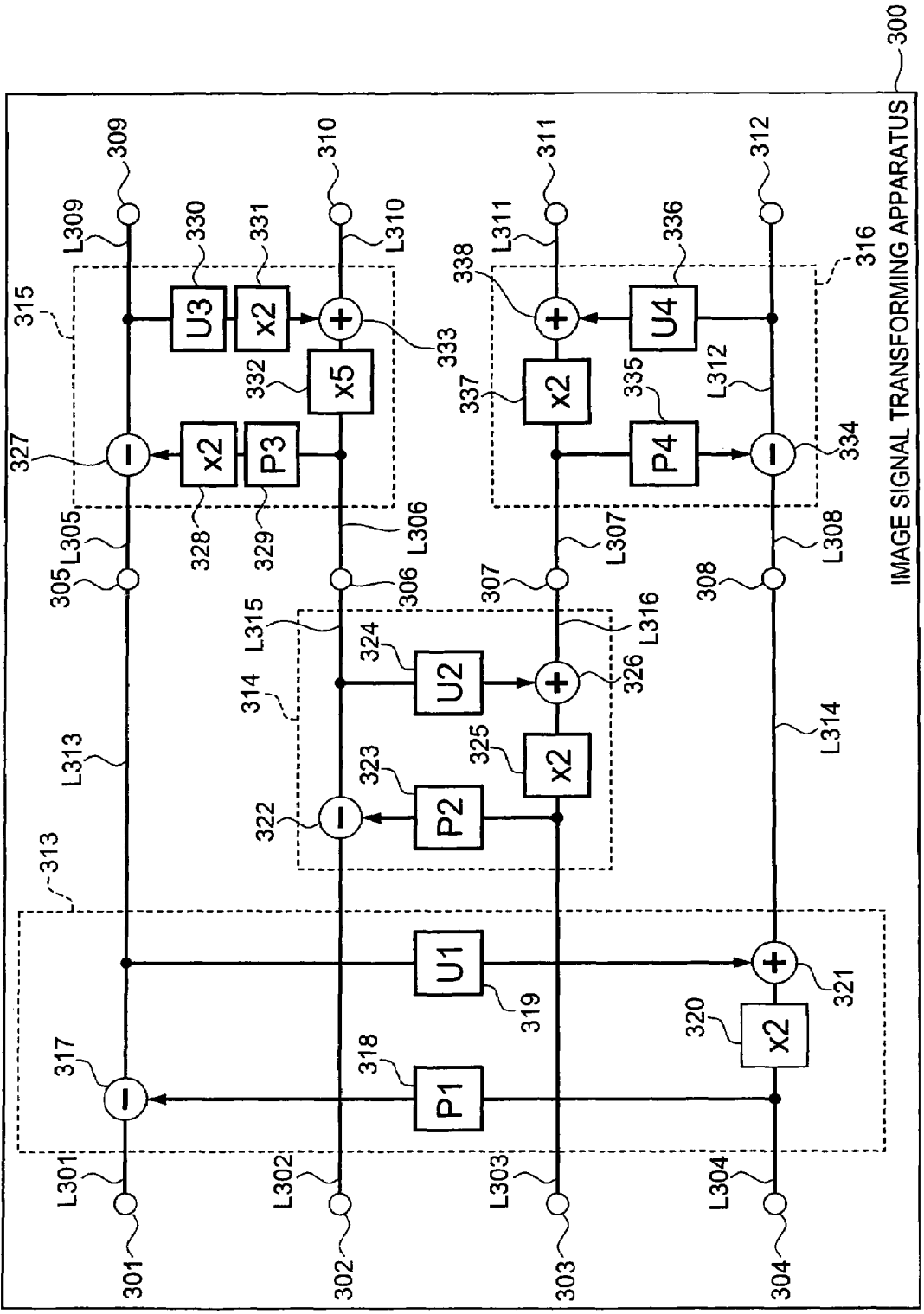
FIG. 3 is a block diagram of an image signal transforming apparatus for executing a first implementation method of an image signal transforming process according to the first embodiment.

FIG. 3 depicts a block diagram of image signal transforming apparatus 300 for executing a first implementation method of an image signal transforming process according to the first embodiment. The image signal transforming apparatus 300 comprises input terminals 301-304, connection terminals 305-308, output terminals 309-312, subtractors 317, 322, 327, 334, adders 321, 326, 333, 338, filters 318, 319, 323, 324, 329, 330, 335, 336, and multipliers 320, 325, 328, 331, 332, 337. These subtractors, adders, and multipliers correspond to the configuration for executing the first arithmetic process or the second arithmetic process stated in Claims.

Figure 5:
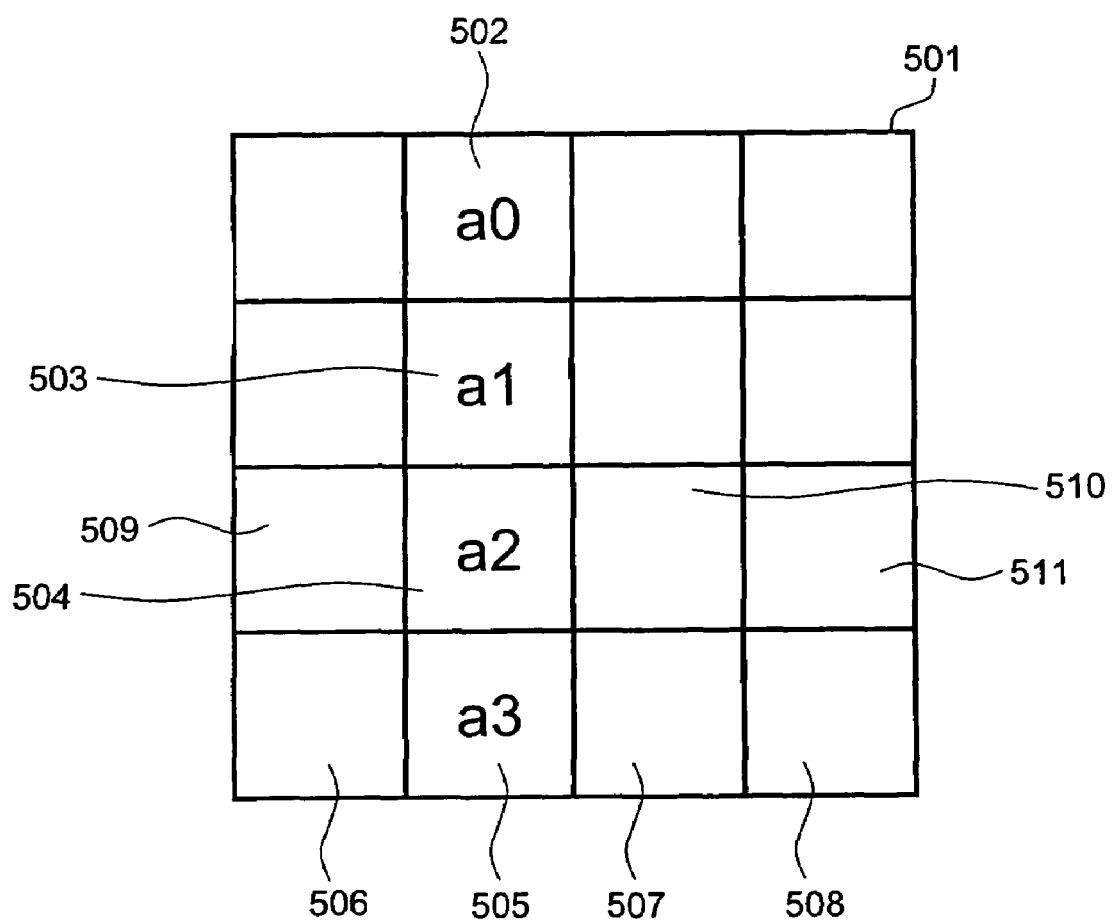
FIG. 5 is a schematic diagram showing an image signal as an object for the image signal transforming process according to the first embodiment.

Concerning the image signal transforming apparatus 300 constructed as described above, the operation thereof will be described below. This image signal transforming apparatus 300 imports image signal 501 consisting of 4×4 pixels shown in FIG. 5. In FIG. 5 each cell corresponds to a pixel. The following will describe one-dimensional transformation with input of a column of signals consisting of four pixels, i.e., input of pixels 502-505 in FIG. 5, but the same process may be performed for each row in FIG. 5. Furthermore, it is also possible to first perform an after-described transformation process for each of columns and then to process the results thereof in a row unit.

Pixels a0 (502)-a3 (505) in FIG. 5 are fed to respective input terminals 301-304. The pixel a3 imported via input terminal 304 is processed by a filter denoted by P1 (318), and the result of the process is subtracted from the pixel a0 imported via the input terminal 301. A signal obtained in this manner is fed to connection terminal 305 and is also fed to and processed by a filter denoted by U1 (319). The result of the process is added to the multiplication result of twice the pixel a3 from multiplier 320 (at adder 321). The result of the addition is fed to the connection terminal 308. A module consisting of the filter 318, arithmetic unit 317, filter 319, and arithmetic units (320 and 321) is defined as fundamental transformation module 313, which transforms input signals. In a case where object signals as objects for transformation are two pixels, the transformation is completed by the above-described processing, but in the present embodiment, where transformation objects are four pixels, the pixels a1 and a2 are similarly transformed by transformation module 314 consisting of filter 323, arithmetic unit 322, filter 324, and arithmetic units (325 and 326). In the present embodiment the filters 323 and 324 are different from the filters 318 and 319, respectively, but the same filters may be used. The data obtained by transformation modules 313 and 314 is fed to transformation module 315 and to transformation module 316 to be subjected to similar processes. The filter 329, arithmetic units (328 and 327), filter 330, and arithmetic units (331, 332, 333) in the transformation module 315 are different from those in the transformation modules 313 and 314, but the fundamental process is the same which comprises performing a filtering process on one input (input from connection terminal 306) signal, subtracting the result from another input (input from connection terminal 305) signal, performing another filtering process on the result of the subtraction, and thereafter adding the result of the filtering to the input signal from connection terminal 306. It is also the same as to the input signals imported from the connection terminals 307 and 308. In this manner, the dc component is outputted from terminal 309 and high-frequency components are outputted from the other terminals (310-312).

In the transformation module 313 in FIG. 3, the filtering process by filter 318 corresponds to the first filtering process stated in Claims, the subtraction by subtractor 317 to the first arithmetic process stated in Claims, the filtering process by filter 319 to the second filtering process stated in Claims, and the addition by adder 321 to the second arithmetic process stated in Claims. In the transformation module 314, the filtering process by filter 323 corresponds to the first filtering process stated in Claims, the subtraction, by subtractor 322 to the first arithmetic process stated in Claims, the filtering process by filter 324 to the second filtering process stated in Claims, and the addition by adder 326 to the second arithmetic process stated in Claims. FIG. 3 shows the transformation process example including both the first transformed sample generating step and the second transformed sample generating step, but the apparatus may also be configured to perform a transformation process including only the first transformed sample generating step. However, in the case where the transformation process includes only the first transformed sample generating step, an inverse transformation process must be one including only a first transformed sample generating step of performing a filtering process in a relation of duality with the first filtering process in the transformation process.

Figure 4:
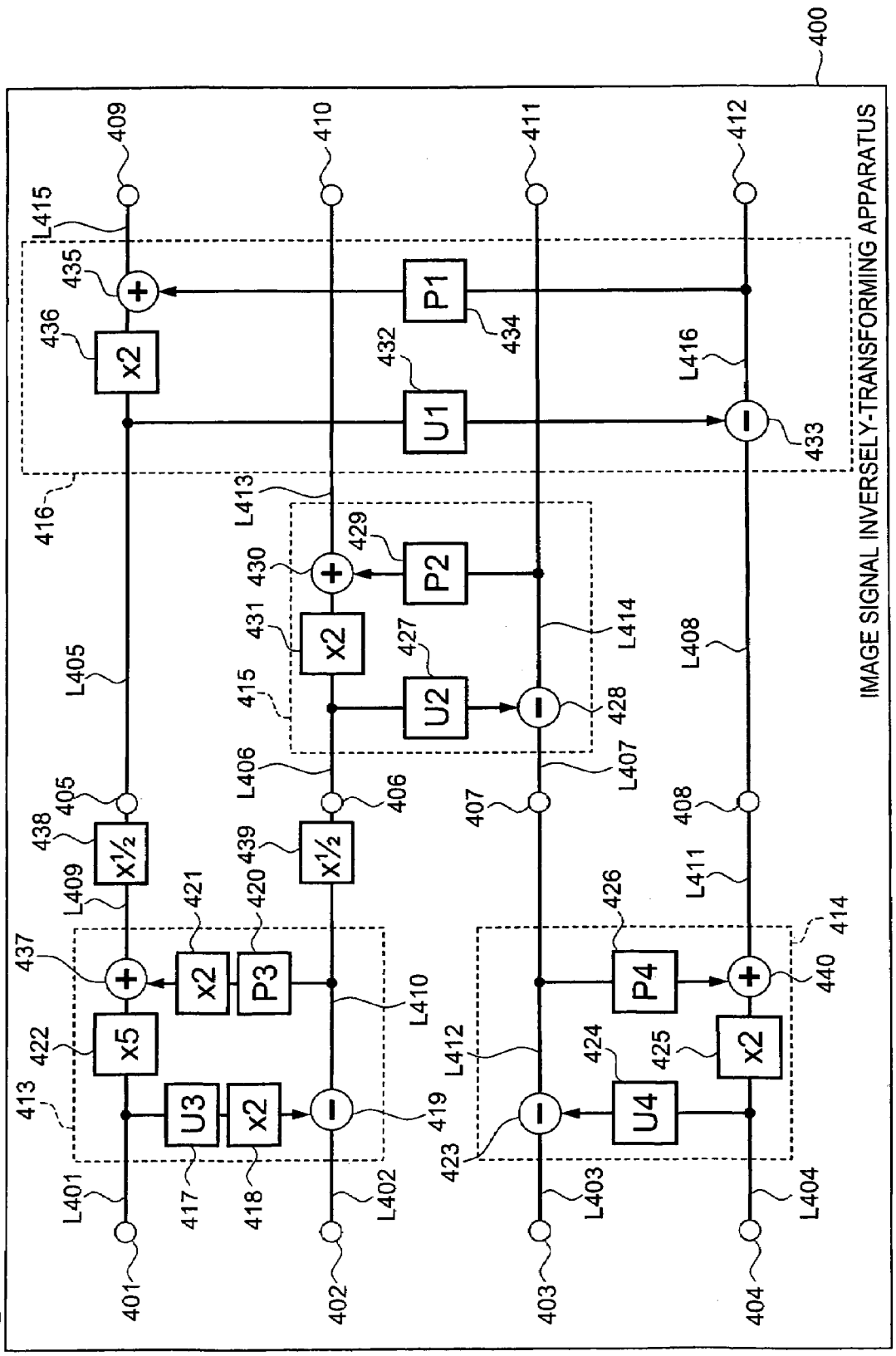
FIG. 4 is a block diagram of an image signal inversely-transforming apparatus for performing an inverse transformation process corresponding to the transformation process in FIG. 3.

Next, an inverse transformation process of an image signal will be described using FIG. 4. FIG. 4 depicts a block diagram of image signal inversely-transforming apparatus 400 for performing the inverse transformation process corresponding to the transformation process of FIG. 3. As shown in this FIG. 4, the image signal inversely-transforming apparatus 400 comprises input terminals 401-404, connection terminals 405-408, output terminals 409-412, subtractors 419, 423, 428, 433, adders 437, 440, 430, 435, filters 417, 420, 424, 426, 427, 429, 432, 434, and multipliers 418, 422, 421, 425, 431, 436. These subtractors, adders, and multipliers correspond to the configuration for executing the first arithmetic process or the second arithmetic process stated in Claims.

The image signal inversely-transforming apparatus 400 in FIG. 4 is an apparatus for performing an inverse process to the process of the image signal transforming apparatus 300 of FIG. 3, to inversely transform coefficients in the frequency domain into signals in the pixel domain, and is structurally composed of four fundamental transformation modules 413-416. In FIG. 4, the transformation coefficients obtained by the transformation process shown in FIG. 3 are input signals to be imported via input terminals 401-404. The coefficient imported via input terminal 401 is filtered by a filter (417) and is then subjected to an arithmetic operation with the coefficient imported via the input terminal 402 (by multiplier 418 and subtractor 419). The result of subtraction is filtered by filter (420) and is then subjected to an arithmetic operation with the input signal from input terminal 401 (by multipliers 421, 422 and adder 437). Similarly, the transformation coefficients imported from input terminals 403 and 404 are processed by transformation module 414. The data obtained in this manner is fed to the connection terminals 405-408 to be processed by transformation modules 415 and 416. In this manner, the transformation coefficients can be inversely transformed into signals in the pixel domain. The multipliers (422, 425, 431, 436, 438, 439) in FIG. 4 are multiplier coefficients determined so as to achieve the same magnitude as the input signals in FIG. 3. The filters (417, 420, 424, 426, 427, 429, 432, 434) used herein are those determined as follows: each filter is determined so that the result of the inverse transformation becomes identical with the signal before the transformation, corresponding to the associated filter in the transformation module in FIG. 3.

In the present embodiment the transformation modules are arranged to add the result of subtraction, but there is also an implementation method of subtracting the result of addition, in which the multiplier coefficients may be set so as to maintain the input energy of the transformer and the output energy of the inverse transformer. The above described the input signals of four pixels, and, in the case of input signals of N pixels (N is an arbitrary integer), data may be processed by locating a corresponding filter before each arithmetic unit (addition/subtraction) in the conventional N×N DCT apparatus and IDCT apparatus.

The filters used in FIGS. 3 and 4 will be described below. Two types of filters are used herein. Namely, it is possible to use a filter with a phase shift and a filter without a phase shift. The filter without a phase shift to be used is a filter with an odd number of taps centered around a pixel as a target for filtering. For example, in the case of the arithmetic operation of a0 (502) and a3 (505) in FIG. 5 (transformation module 313 in FIG. 3), a 3-tap filter with a3 at the center is used to perform a filtering process on pixels 506, 505, 507 to generate a signal. The filter with a phase shift to be used can be a filter with an even number of taps and filter matched in a phase to be shifted. For example, in order to obtain a filtering result of shifting the pixel 505 in FIG. 5 by a half pixel to the left, an average of pixels 505 and 506 is determined. Linear interpolation of pixel 505 and pixel 507 is used to achieve a shift of a quarter pixel to the right. The filter with a phase shift is effective in the case where there is some deviation in signals as objects for transformation, and is effective, particularly, in the case where the accuracy of the prediction signal is low arid a correlative signal component remains in the differential signal. The filter without a phase shift is effective in the case where the signals contain many random noise components.

The relation of two filters used in the transformation modules (313, 314, 315, 316 in FIG. 3 and 413, 414, 415, 416 in FIG. 4) according to the present invention will be described. The filters P1 (318) and U1 (319) in the transformation module 313 are in the relation of duality. Namely, if P1 is a low-pass filter, U1 is a band-pass filter. If P1 shifts the phase to the right, U1 shifts the phase to the left. Furthermore, U1 does not have to be used depending upon characteristics of P1, or P1 does not have to be used depending upon characteristics of U1. In addition, P1 and U1 may be identical filters, depending upon characteristics. The same also applies to P2 and U2, P3 and U3, and P4 and U4.

The filtering processes used in the transformation and inverse transformation methods of image signals according to the present invention require pixels located in a region across a boundary of an object block in certain cases. In particular, in a case where a column or row at a boundary of a block is transformed, the boundary value problem arises. In this case the filtering process may be carried out using pixel values in a region of an adjacent block, but the present embodiment is arranged to perform the filtering process repeatedly using pixel values at the boundary.

Figure 6:
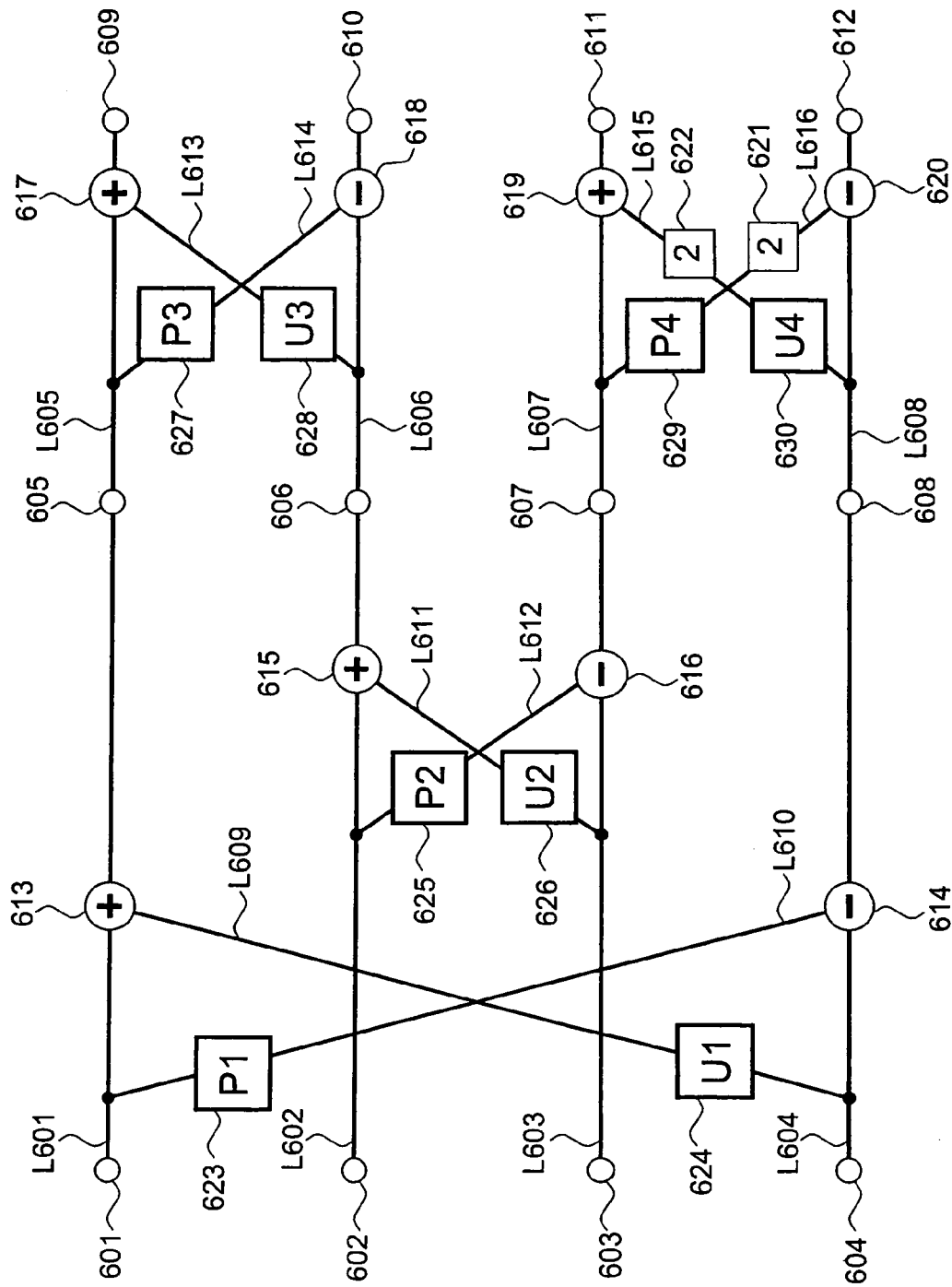
FIG. 6 is a block diagram of an image signal transforming apparatus for executing a second implementation method of the image signal transforming process according to the first embodiment.

FIG. 6 depicts a block diagram of an image signal transforming apparatus for executing a second implementation method of the image signal transforming process according to an embodiment of the present invention. This image signal transforming apparatus comprises input terminals 601-604, connection terminals 605-608, output terminals 609-612, subtractors 614, 616, 618, 620, adders 613, 615, 617 619, filters 623, 624, 625, 626, 627, 628, 629, 630, and multipliers 621, 622. Four pixels a0, a1, a2, a3 are imported via respective input terminals 601-604. The signal a3 imported from input terminal 604 into filter 624 is filtered by the filter (624), and the filtered signal a3 is added to the signal a0 by adder 613. The signal a0 imported from the input terminal 601 into filter 623 is filtered by the filter (623) and a difference is calculated between the filtered signal a0 and the signal a3 by the subtractor 614. Similarly, the signals a1 and a2 each are filtered and then subjected to arithmetic operations by adder 615 and subtractor 616. These results are fed via respective terminals 605-608 to the next stage. The signals from terminals 605 and 606 are processed by respective filters 627 and 628 and subjected to arithmetic operations by adder 617 and subtractor 618. The signals from terminals 607 and 608 are processed by respective filters 629 and 630 and then processed by adder 619, subtractor 620, and multipliers 621 and 622. The results obtained in this manner are coefficients in the frequency domain and outputted via terminals 609-612.

In FIG. 6, the filtering process by filter 623 corresponds to the first filtering process stated in Claims, the subtraction by subtractor 614 to the first arithmetic process stated in Claims, the filtering process by filter 624 to the second filtering process stated in Claims, and the addition by adder 613 to the second arithmetic process stated in Claims. The filtering process by filter 625 corresponds to the first filtering process stated in Claims, the subtraction by subtractor 616 to the first arithmetic process stated in Claims, the filtering process by filter 626 to the second filtering process stated in Claims, and the addition by adder 615 to the second arithmetic process stated in Claims. FIG. 6 shows the transformation process example including both of the first transformed sample generating step and the second transformed sample generating step, but the transformation process may be one including only the first transformed sample generating step. However, in the case where the transformation process includes only the first transformed sample generating step, the inverse transformation process must be one including only the first transformed sample generating step of performing the filtering process in the relation of duality with the first filtering process in the transformation process.

Figure 7:
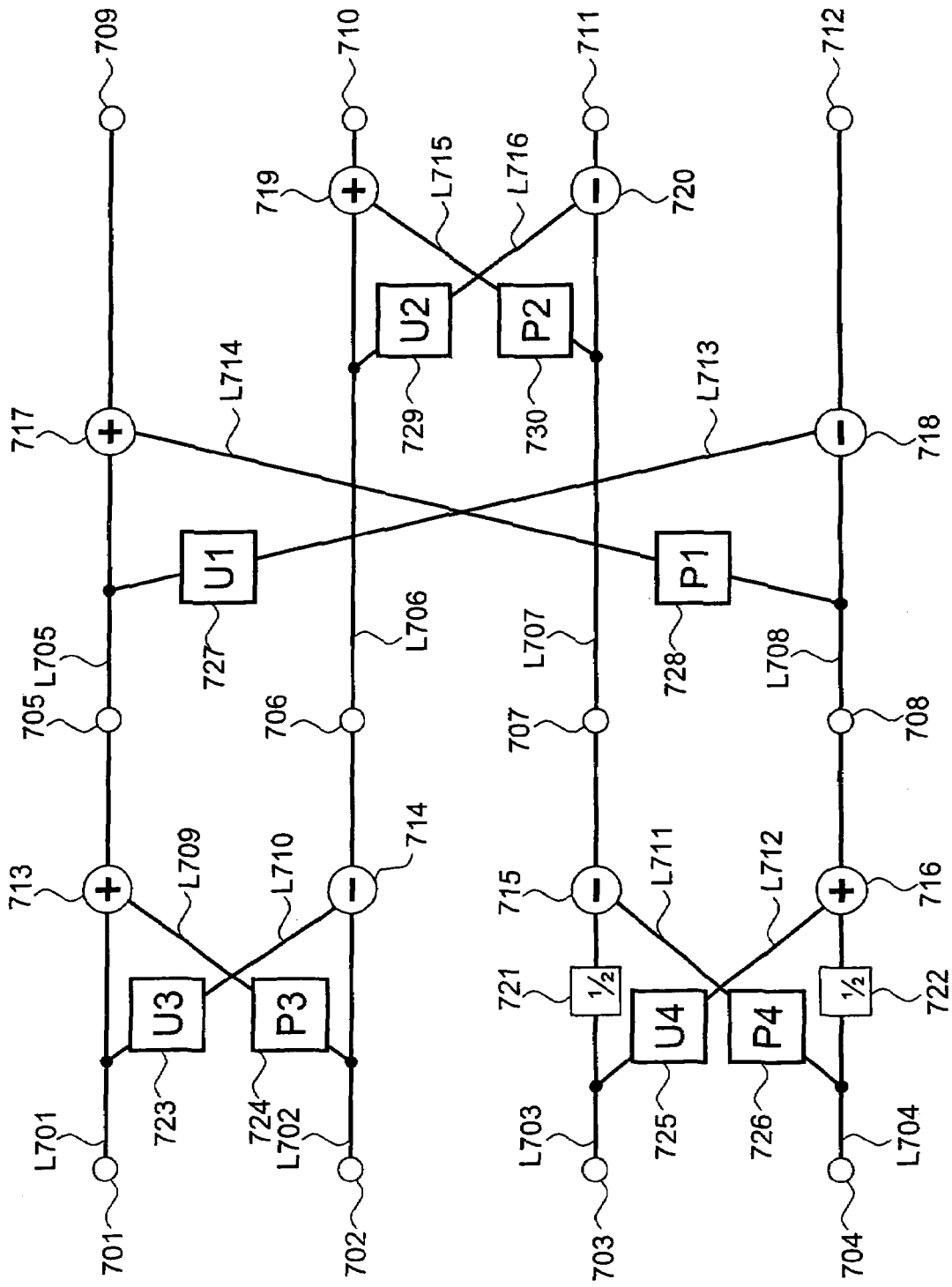
FIG. 7 is a block diagram of an image signal inversely-transforming apparatus for performing an inverse transformation process corresponding to the transformation process in FIG. 6.

Next, an inverse transformation process of an image signal will be described with reference to FIG. 7. FIG. 7 depicts a block diagram of an image signal transforming apparatus for performing the inverse transformation process corresponding to the transformation process of FIG. 6. Coefficients in the frequency domain are imported via respective input terminals 701-704. The coefficients from the terminals 701 and 702 are processed by respective filters 723 and 724 and subjected to arithmetic operations by adder 713 and subtractor 714. The coefficients from terminals 703 and 704 are processed by respective filters 725 and 726 and subjected to arithmetic operations by subtractor 715, adder 716, and multipliers 721 and 722. The signals obtained in this manner are fed via terminals 705-708 to the next stage. The signals from terminals 705 and 708 are processed by respective filters 727 and 728 and subjected to arithmetic operations by adder 717 and subtractor 718, and the signals from terminals 706 and 707 are processed by respective filters 729 and 730 and subjected to arithmetic operations by adder 719 and subtractor 720. The coefficients in the frequency domain are inversely transformed into original pixels a0, a1, a2, and a3 as described above, and are outputted from respective terminals 709-712. The relations between filters P1 and U1, between P2 and U2, between P3 and U3, and between P4 and U4 are the same as in FIG. 6. Those relations are in the relation of duality as described above.

Figure 8:
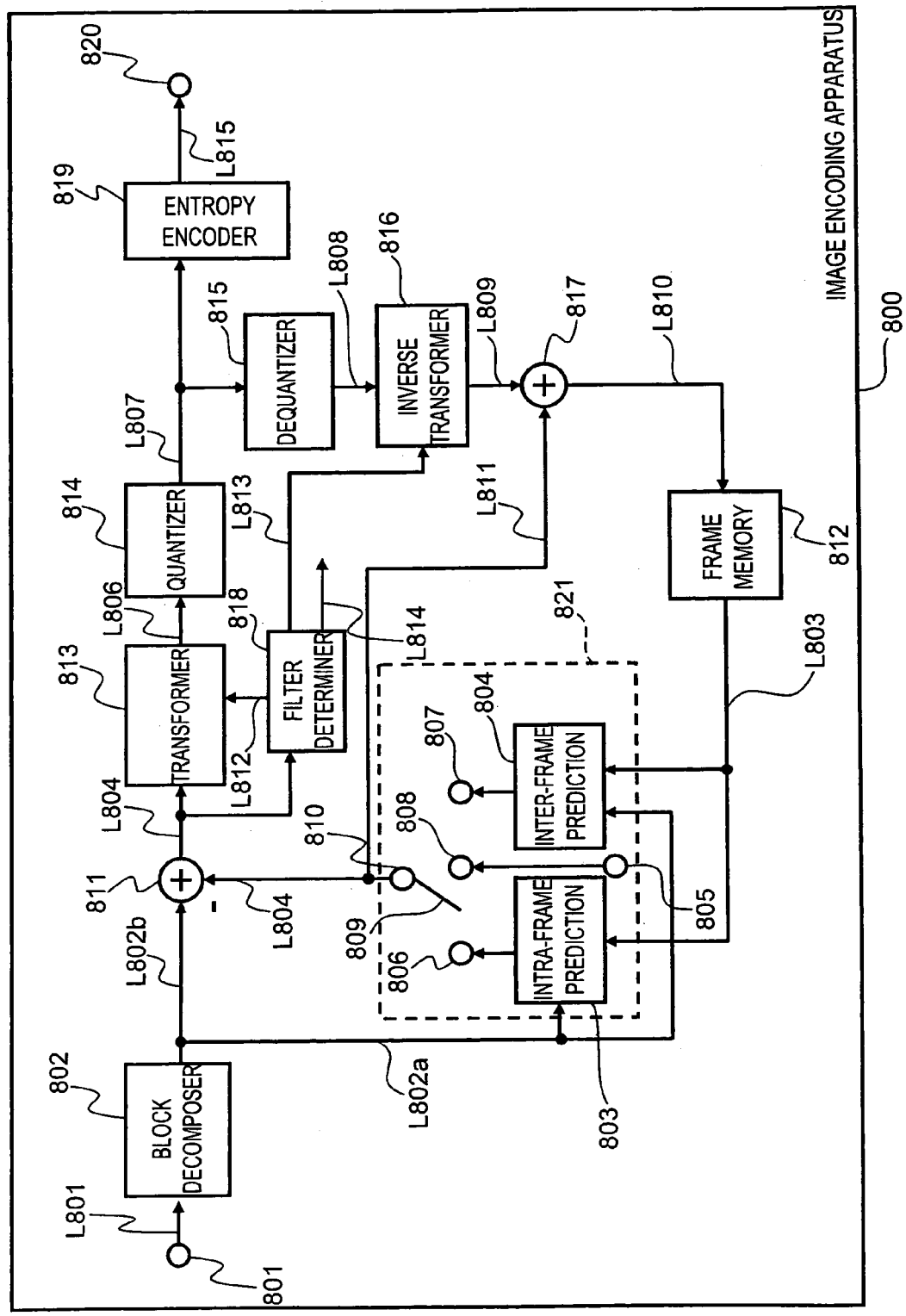
FIG. 8 is a block diagram showing an image encoding apparatus of the first and second embodiments.

An image encoding apparatus, method, and program using the image signal transforming process according to the embodiment of the present invention will be described below. FIG. 8 depicts a block diagram of image encoding apparatus 800 using the above-described image signal transforming process. The image encoding apparatus 800 comprises input terminal 801, block decomposer 802, intra-frame predictor 803, inter-frame predictor 804, connection terminals 805, 806, 807, 808, 810, selector switch 809, adder 811, frame memory 812, transformer 813, quantizer 814, dequantizer 815, inverse transformer 816, adder 817, filter determiner 818, entropy encoder 819, and output terminal 820. A means including the intra-frame predictor 803 and inter-frame predictor 804 will be generally referred to as prediction signal generator 821.

Concerning the image -encoding apparatus constructed as described above, the operation thereof will be described below. A plurality of images constituting a motion picture are imported via input terminal 801 and each image is decomposed into blocks of N×M pixels by block decomposer 802. In the present embodiment N=M=8, but N does not have to equal M. It is also possible to adopt decomposition in the other sizes than 8 pixels. A block as an object for coding is fed via line L820a to intra-frame predictor 803 and to inter-frame predictor 804. The intra-frame predictor 803 imports a block signal as an object for coding and a previously reconstructed image signal forming the same frame stored in frame memory 812, and generates a frame prediction signal similar to that in Standard H.264. The inter-frame predictor 804 imports a block as an object for coding and a previously reconstructed signal of a different frame stored in frame memory 812, and generates an inter-frame prediction signal by motion detection prediction similar to that in Standard H.264. The encoding apparatus according to the present invention provides for a case without any input by terminal 805. Namely, an original signal directly becomes an object for coding. The selector switch 809 selects a mode to minimize the number of bits, out of three cases of the prediction signal by the intra-frame predictor 803, the prediction signal by the inter-frame predictor 804, and no prediction signal. The prediction signal determined as described above is fed to adder 811 and a difference is determined from a block as an object for coding. The differential signal determined is fed to filter determiner 818. The filter determiner 818 transforms the differential signal by the aforementioned image signal transforming method with a plurality of filters to estimate the number of bits of transformation coefficients.

The present embodiment is arranged to determine filters to minimize the number of bits after entropy coding of transformation coefficients and to feed an identifier to identify each filter, to transformer 813. The transformer 813 performs the transformation, using the filters determined by the filter determiner 818. In the present embodiment, a block of 8×8 pixels is further divided into 4×4 pixel units and the transformation is performed to filter only columns of each 4×4 block. The transformation coefficients obtained in this manner are fed to quantizer 814 to be quantized. The quantized coefficients are fed to entropy encoder 819 to be encoded by variable length coding, and coded data is outputted from output terminal 820. On the other hand, the quantized coefficients are dequantized by dequantizer 815, the dequantized coefficients are inversely transformed by the filters determined by the filter determiner (at inverse transformer 816), the result is added to the prediction signal (fed via line L811) by adder 817, to generate a reconstructed signal, and the reconstructed signal is stored in frame memory 812. The identifiers of the filters determined by the filter determiner 818 are fed via line L814 to entropy encoder 819 and they, together with other data, are outputted from output terminal 820.

Figure 9:
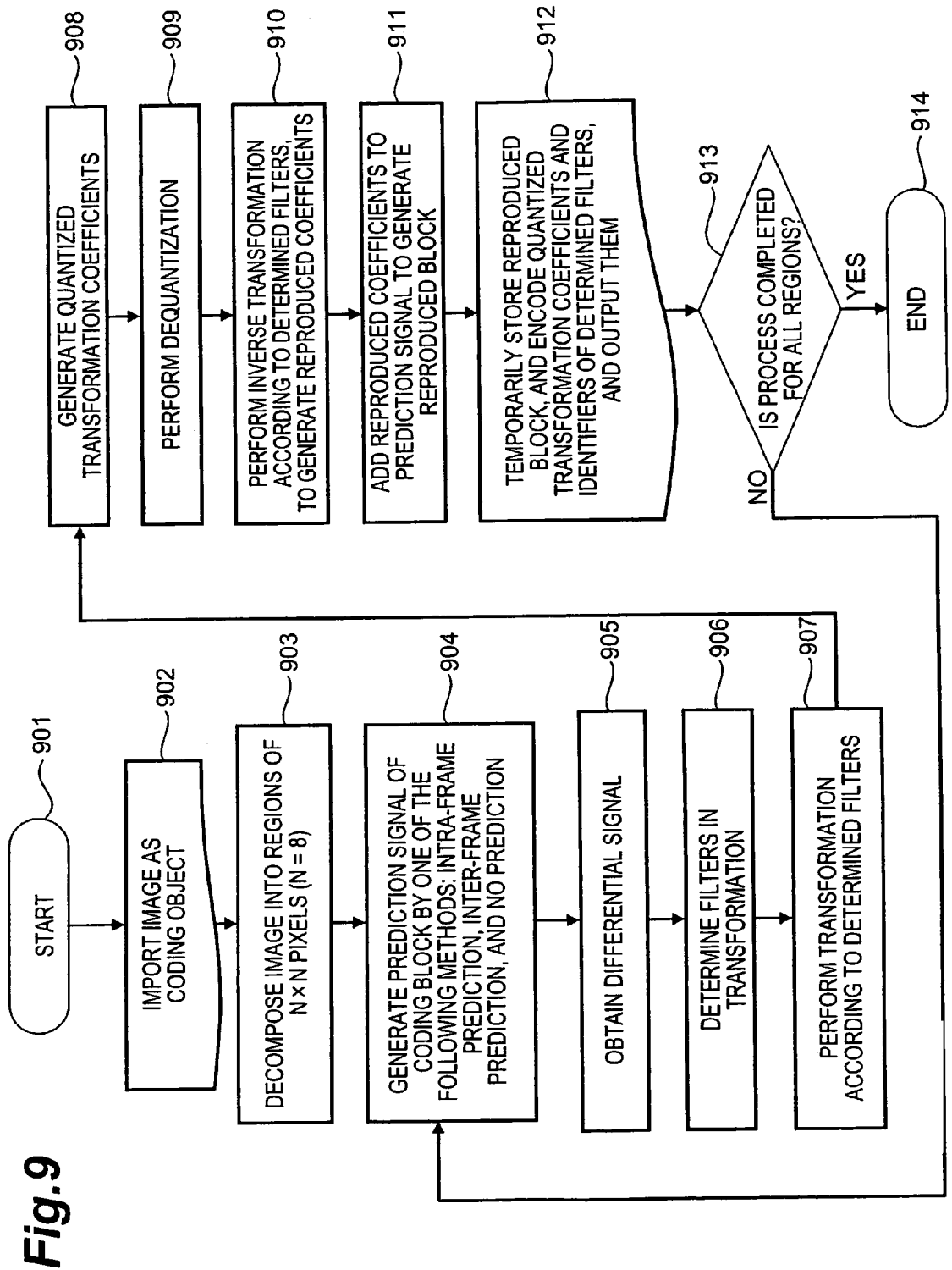
FIG. 9 is a flowchart showing an image encoding method of the first embodiment.

FIG. 9 shows a flowchart of an image encoding method using the image signal transforming process according to the embodiment of the present invention. An image as an object for coding is first imported (step 902). The image is decomposed into blocks of 8×8 pixels at step 903. Next step 904 is to generate a prediction signal for a block as an object for coding. In the present embodiment one mode is selected from the three modes of intra-frame prediction, inter-frame prediction, and no prediction. The prediction signal is a signal with the least error out of these prediction signals. Step 905 is to determine a difference between the prediction signal and the block as an object for coding to generate a differential signal. Next step 906 is to perform a transformation process according to the aforementioned method using a plurality of filters on the differential signal to determine filters that can provide the signal in the most compact form. The transformation process is carried out according to the filters determined in this manner (907). The transformation coefficients are quantized at step 908 to generate quantized transformation coefficients. Step 909 is to perform dequantization of the quantized transformation coefficients and then the inverse transformation is carried out using the filters determined at step 906, to generate reconstructed coefficients (step 910). Step 911 is to add the reconstructed coefficients to the prediction signal determined at step 904, to generate a reconstructed block. Finally, the reconstructed block is temporarily stored and the quantized transformation coefficients and the filter identifiers are entropy encoded and outputted (step 912). The above flow is applied to all the blocks and all the images. If the transformation coefficients obtained in the determining process of the filters for the transformation (step 906) are outputted, the transformation process does not have to be carried out again, and thus step 907 may be omitted. The present embodiment uses nine types of filters including a filter without a phase shift, and filters with a phase shift of 1/8, 2/8, 3/8, 4/8, −1/8, −2/8, −3/8, or −4/8.

Figure 10:
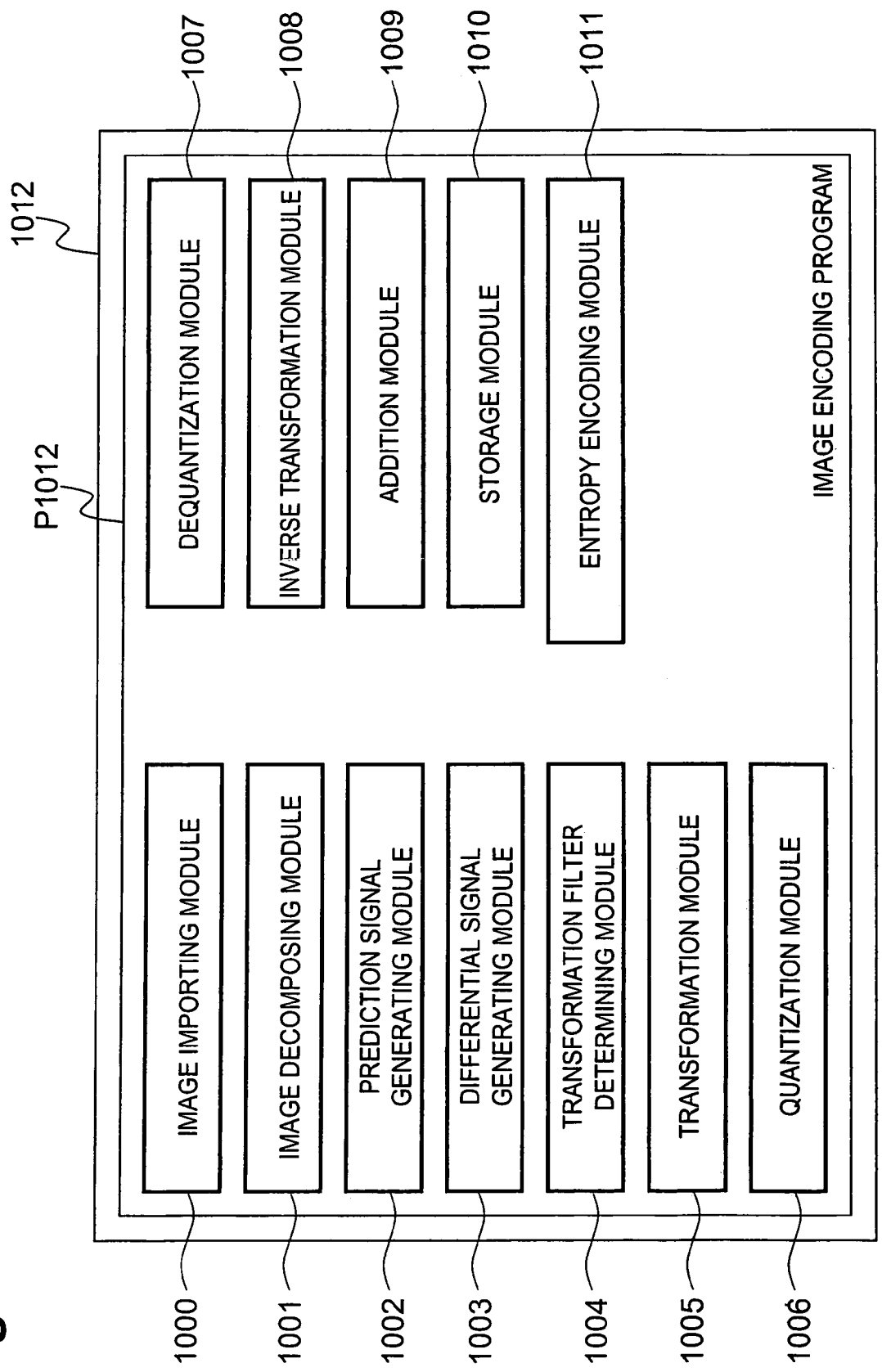
FIG. 10 is an illustration conceptually showing a configuration of an image encoding program according to the first embodiment.

Next, an image encoding program for letting a computer operate as an image encoding apparatus according to the present invention will be described. FIG. 10 is an illustration showing a configuration of image encoding program P1012 using the image signal transforming process according to the embodiment of the present invention, along with recording medium 1012. As shown in FIG. 10, the image encoding program P1012 is provided as stored in recording medium 1012. The recording medium 1012 can be, for example, a recording medium such as a flexible disk, a CD-ROM, a DVD, or a ROM, or a semiconductor memory, or the like.

Figure 14:
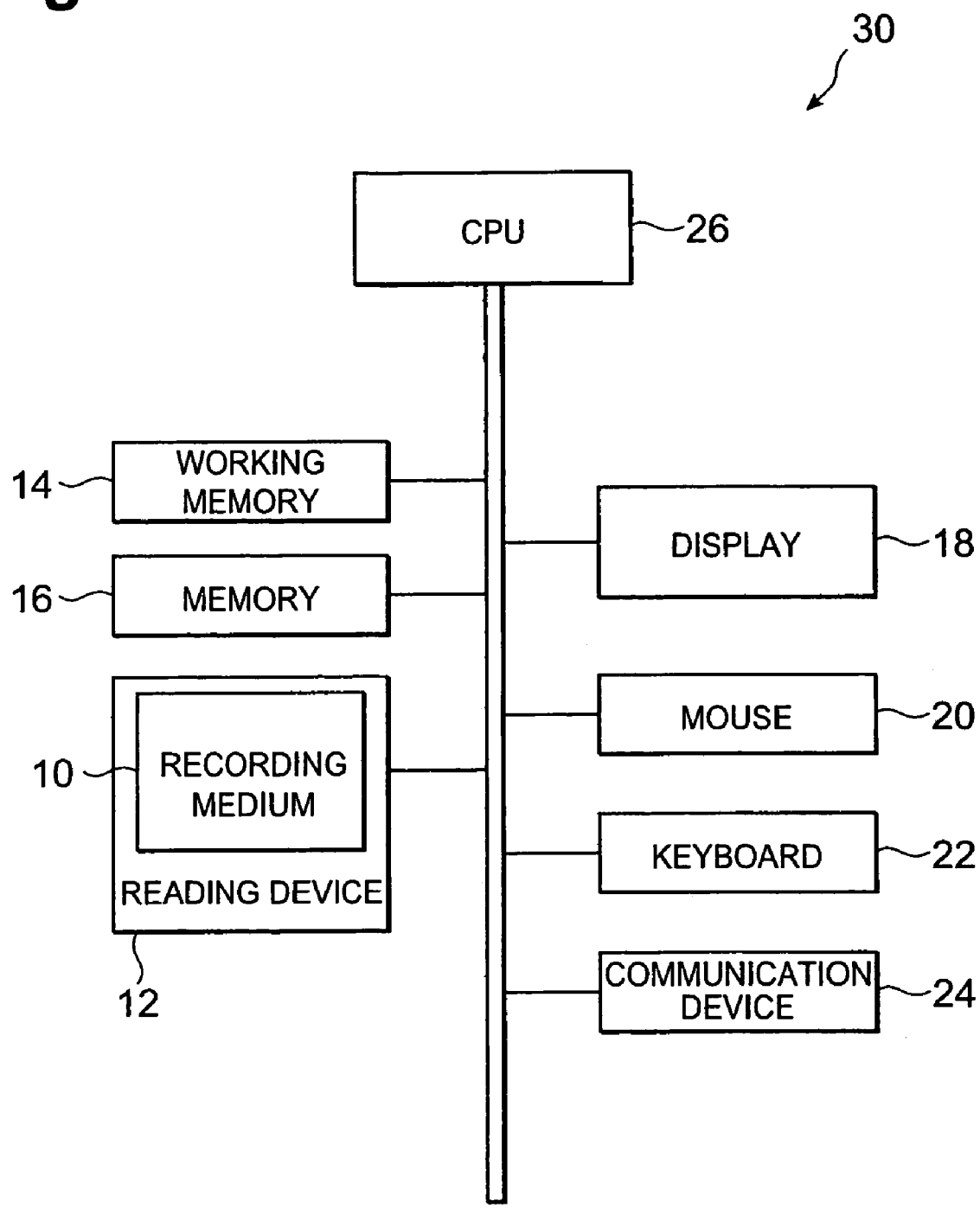
FIG. 14 is an illustration showing a hardware configuration of a computer for executing a program recorded in a recording medium.
Figure 15:
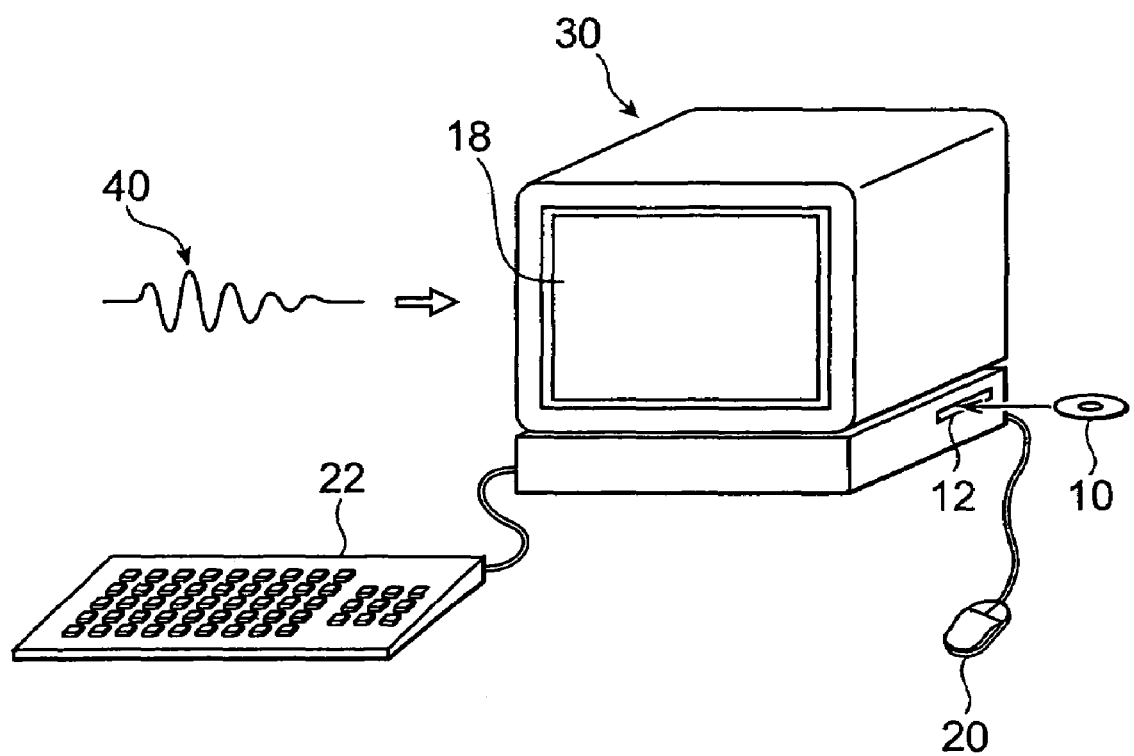
FIG. 15 is a perspective view of a computer for executing a program stored in a recording medium.

FIG. 14 is an illustration showing a hardware configuration of a computer for executing a program recorded in a recording medium, and FIG. 15 a perspective view of a computer for executing a program stored in a recording medium. The computer embraces a DVD player, a set-top box, a cell phone, etc. equipped with a CPU and configured to perform processing and control according to software.

As shown in FIG. 14, the computer 30 comprises reading device 12 such as a flexible disk drive, a CD-ROM drive, or a DVD drive, working memory (RAM) 14 in which an operating system is resident, memory 16 for storing a program stored in recording medium 10, display unit 18 such as a display, mouse 20 and keyboard 22 as input devices, communication device 24 for transmission and reception of data and others, and CPU 26 for controlling execution of the program. When the recording medium 10 is set in the reading device 12, the computer 30 becomes accessible from the reading device 12 to the image encoding program P1012 stored in the recording medium 10, and becomes able to operate as the image encoding apparatus according to the present invention, based on the image encoding program P1012.

As shown in FIG. 15, the image encoding program P1012 may be one provided in the form of computer data signal 40 superimposed on a carrier wave, through a network. In this case, the computer 30 stores the image encoding program P1012 received by communication device 24, into memory 16 and becomes able to execute the image encoding program P1012.

As shown in FIG. 10, the image encoding program P1012 comprises image importing module 1000, image decomposing module 1001, prediction signal generating module 1002, differential signal generating module 1003, transformation filter determining module 1004, transformation module 1005, quantization module 1006, dequantization module 1007, inverse transformation module 1008, addition module 1009, storage module 1010, and entropy encoding module 1011. The image importing module 1000 corresponds to the input terminal 801 in FIG. 8, the image decomposing module 1001 to the block decomposer 802 in FIG. 8, the prediction signal generating module 1002 to the prediction signal generator 821 in FIG. 8, the differential signal generating module 1003 to the adder 811 in FIG. 8, the transformation filter determining module 1004 to the filter determiner 818 in FIG. 8, the transformation module 1005 to the transformer 813 in FIG. 8, the quantization module 1006 to the quantizer 814 in FIG. 8, the dequantization module 1007 to the dequantizer 815 in FIG. 8, the inverse transformation module 1008 to the inverse transformer 816 in FIG. 8, the addition module 1009 to the adder 817 in FIG. 8, the storage module 1010 to the frame memory 812 in FIG. 8, and the entropy encoding module 1011 to the entropy encoder 819 in FIG. 8.

Figure 11:
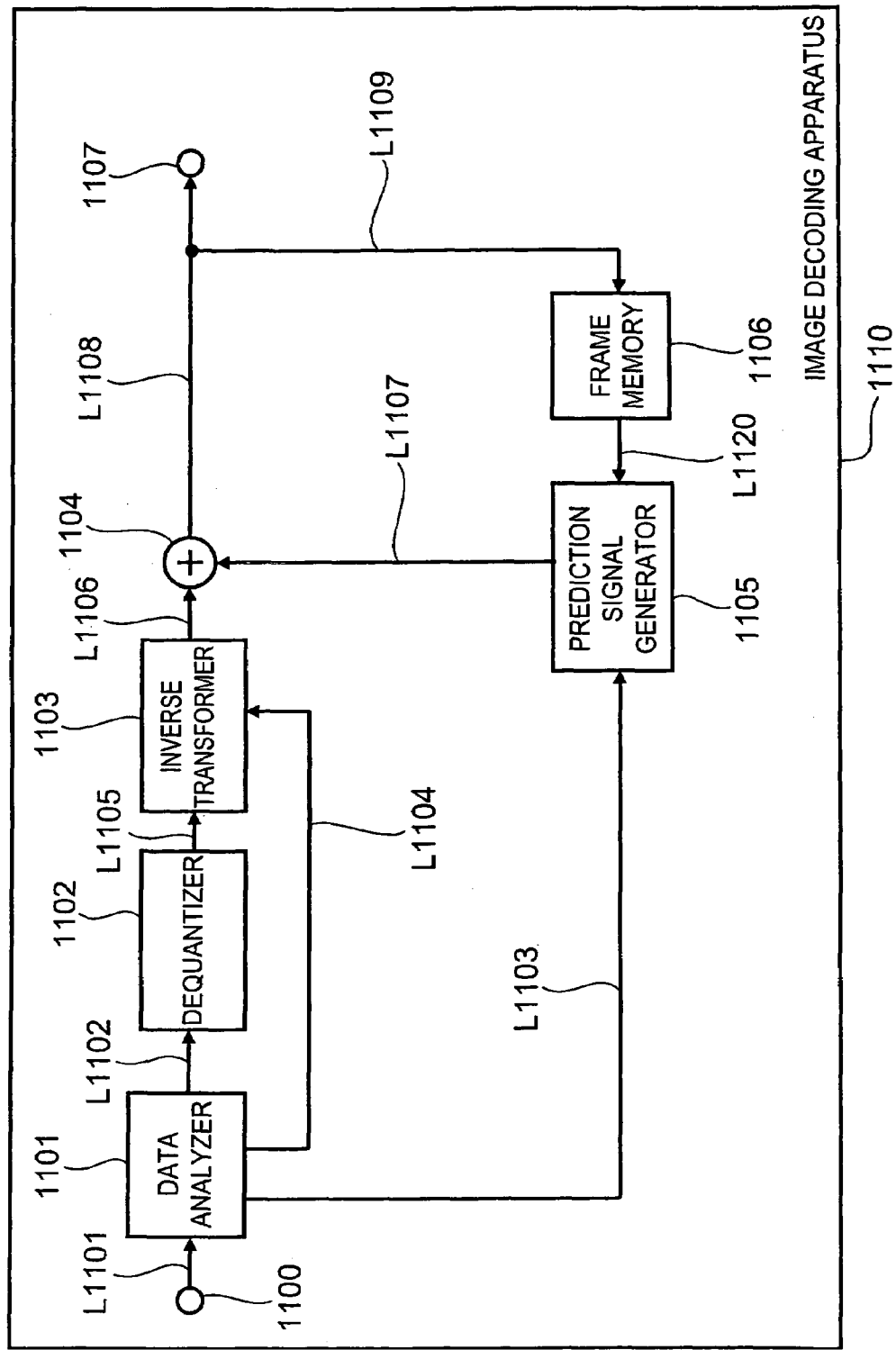
FIG. 11 is a block diagram showing an image decoding apparatus of the first and second embodiments.

FIG. 11 is a block diagram of image decoding apparatus 1110 using the inverse transformation process of the image signal according to the embodiment of the present invention. The image decoding apparatus 1110 comprises input terminal 1100, data analyzer 1101, dequantizer 1102, inverse transformer 1103, adder 1104, prediction signal generator 1105, frame memory 1106, and output terminal 1107.

Imported via input terminal 1100 is compressed data generated by performing either intra-frame prediction or inter-frame prediction on an image decomposed into a plurality of regions and then performing transformation and coding. The data analyzer 1101 analyzes the compressed data and performs an entropy decoding process, and it also extracts quantized transformation coefficients, information about quantization, mode information about generation of the prediction signal, and identifiers indicating the filters to be used in the inverse transformation process. The quantized transformation coefficients and the information about quantization are fed via line L1102 to dequantizer 1102, which generates dequantized transformation coefficients. The dequantized transformation coefficients are fed via line L1105 and the identifiers indicating the filters to be used in the inverse transformation process are fed via line L1104 to inverse transformer 1103, which performs the inverse transformation using the designated filters to generate an inversely transformed signal. The inverse transformation process is the one as described above. The mode information about generation of the prediction signal is fed via line L1103 to the prediction signal generator 1105, which determines the intra-frame prediction or inter-frame prediction, or no prediction, based on the information, to generate the prediction signal. The inversely transformed signal and the prediction signal obtained in this manner are added at adder 1104 and the result is stored in frame memory 1106 and also outputted via output terminal 1107 in order to display it.

Figure 12:
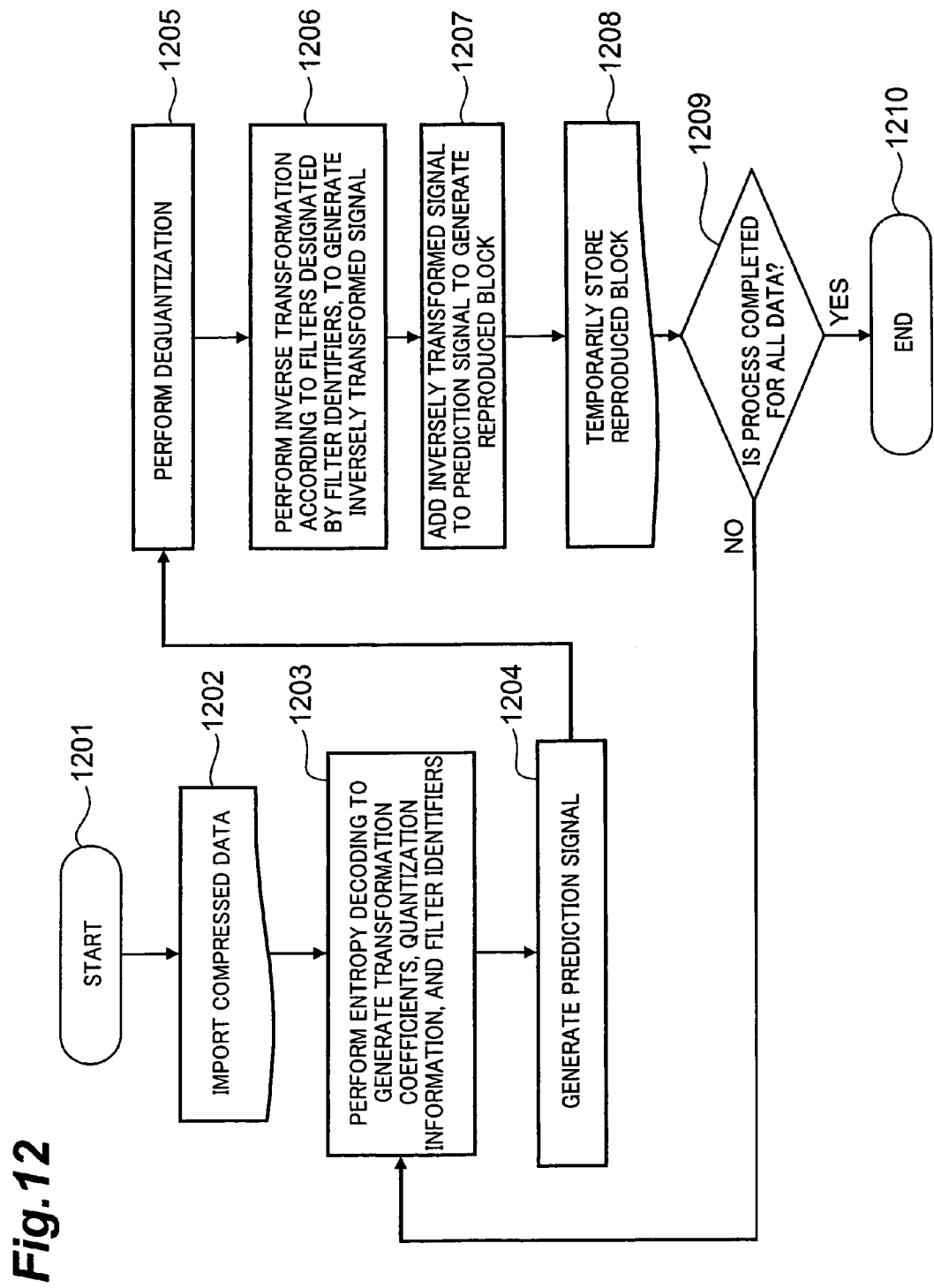
FIG. 12 is a flowchart showing an image decoding method according to the first embodiment.

FIG. 12 is a flowchart of an image decoding method using the inverse transformation process of the image signal according to the embodiment of the present invention. Compressed data is imported at step 1202. Next step 1203 is to perform entropy decoding on the compressed data to extract quantized transformation coefficients, information about quantization, information about generation of the prediction signal, and identifiers of filters. Step 1204 is to generate the prediction signal on the basis of the information about generation of the prediction signal. Step 1205 is to dequantize the quantized transformation coefficients, and step 1206 is to perform the inverse transformation according to the filters designated by the filter identifiers, to generate an inversely transformed signal. Step 1207 is to add the prediction signal and the inversely transformed signal to generate a reconstructed block signal. This reconstructed block signal is temporarily stored at step 1208. This processing is repeated before completion of processing for all the data.

Figure 13:
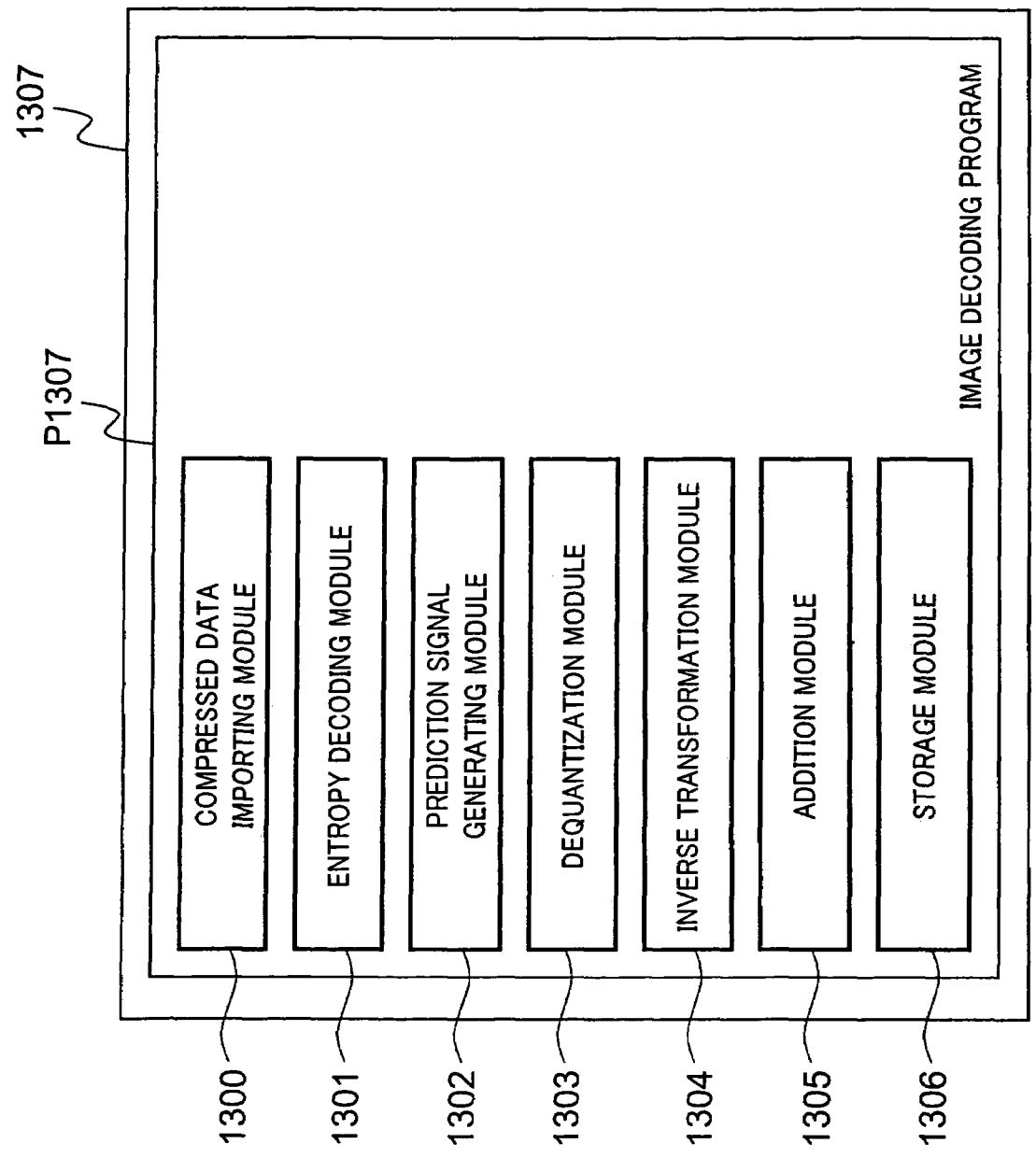
FIG. 13 is an illustration conceptually showing a configuration of an image decoding program in the first and second embodiments.

Next, an image decoding program for letting a computer operate as an image decoding apparatus according to the present invention will be described. FIG. 13 is an illustration showing a configuration of image decoding program P1307 using the image signal transforming process according to the embodiment of the present invention, along with recording medium 1307. As shown in FIG. 13, the image decoding program P1307 is provided as stored in recording medium 1307. The image decoding program P1307 enables the computer to operate as an image decoding apparatus according to the present invention. The details are those as described using FIGS. 14, and 15.

As shown in FIG. 13, the image decoding program P1307 comprises compressed data importing module 1300, entropy decoding module 1301, prediction signal generating module 1302, dequantization module 1303, inverse transformation module 1304, addition module 1305, and storage module 1306. The compressed data importing module 1300 corresponds to the input terminal 1100 in FIG. 11, the entropy decoding module 1.301 to the data analyzer 1101 in FIG. 11, the prediction signal generating module 1302 to the prediction signal generator 1105 in FIG. 11, the dequantization module 1303 to the dequantizer 1102 in FIG. 11, the inverse transformation module 1304 to the inverse transformer 1103 in FIG. 11, the addition module 1305 to the adder 1104 in FIG. 11, and the storage module 1306 to the frame memory 1106 in FIG. 11.

As described above, the signal transformation process is carried out to transform the signals after the filtering process to enhance the correlation of the input signals, thereby achieving the effect of capability of expressing the signals in a more compact form and achieving efficient coding of the image signal.

Second Embodiment

An image signal transforming apparatus according to the second embodiment will be described below with reference to the accompanying drawings.

Figure 16:
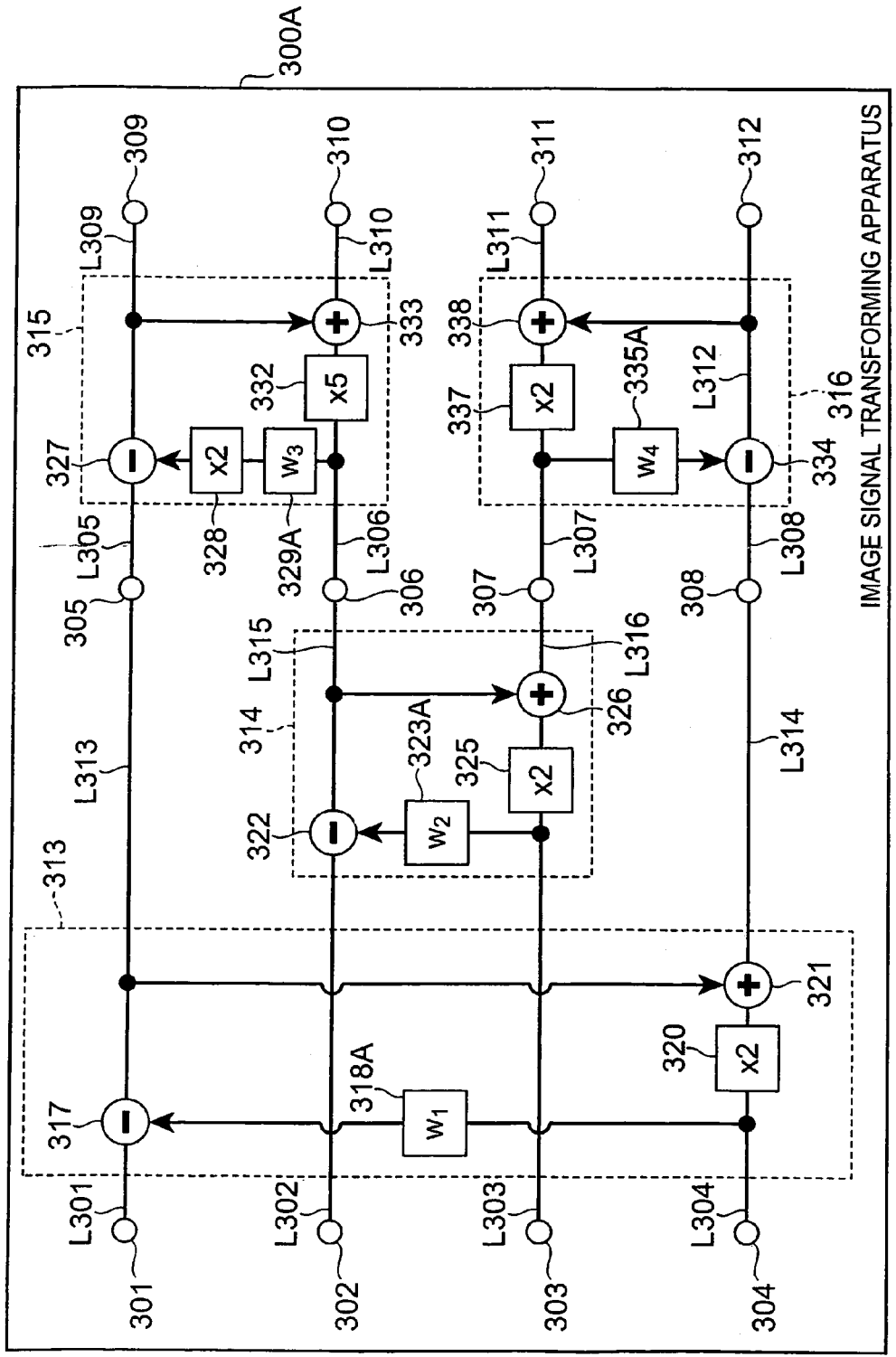
FIG. 16 is a block diagram of an image signal transforming apparatus according to the second embodiment.

FIG. 16 is an illustration showing a configuration of an image signal transforming apparatus according to the present invention. The image signal transforming apparatus 300A according to the present embodiment comprises input terminals 301-304, connection terminals 305-308, output terminals 309-312, subtractors 317, 322, 327, 334, adders 321, 326, 333, 338, weighting devices 318A, 323A, 329A, 335A, and multipliers 320, 325, 328, 332, 337. These components are connected so as to be able to import and export signals from and to each other through a bus.

The image signal transforming apparatus 300A imports image signal 501 consisting of 4×4 pixels shown in FIG. 5. In FIG. 5, each cell corresponds to a pixel. The following will describe one-dimensional transformation with input of a column of signals consisting of four pixels, i.e., input of pixels 502-505 in FIG. 5, but the same processing may also be carried out for each row in FIG. 5. Furthermore, it is also possible to first perform the after-described transformation process for each column and thereafter process the result in a row unit.

The pixels "a0" (502) to "a3" (505) in FIG. 5 are imported via respective input terminals 301-304. The pixel "a3" imported from input terminal 304 is weighted by $w_1$ (318A) and thereafter the result is subtracted from the pixel "a0" imported via input terminal 301. An intermediate value obtained in this manner is outputted to connection terminal 305 and is also outputted to adder 321.

The adder 321 adds the intermediate value to twice the pixel "a3" obtained by the multiplier 320. An intermediate value resulting from the addition is outputted to connection terminal 308. Namely, the image signal transforming apparatus 300A includes a module consisting of the weighting device 318A, arithmetic unit 317, and arithmetic units 320, 321 as fundamental transformation module 313 and transforms the input signals.

The transformation is completed by the above-described processing in the case where the target signal as an object of transformation is composed of two pixels, but, because the present embodiment handles the transformation object of four pixels, the pixels "a1" and "a2" are also similarly transformed by transformation module 314 consisting of weighting device 323A, arithmetic unit 322, and arithmetic units (325 and 326). In the present embodiment the weighting device 323A performs the weighting process with a weighting factor different from that of the weighting device 318A, but they may be arranged to use the same weighting factor.

The intermediate values obtained by the transformation modules 313, 314 are outputted to transformation module 315 and to transformation module 316 and are subjected to similar processes. The weighting device 329A, arithmetic units (328, 327), and arithmetic units (332, 333) in the transformation module 315 are different from those in the transformation modules 313, 314. However, the fundamental process is much the same, which includes performing a weighting process on one input (input from connection terminal 306) signal, subtracting the weighted signal from another input (input from connection terminal 305) signal, and again adding the result of the subtraction to the input signal from the connection terminal 306.

Figure 1:
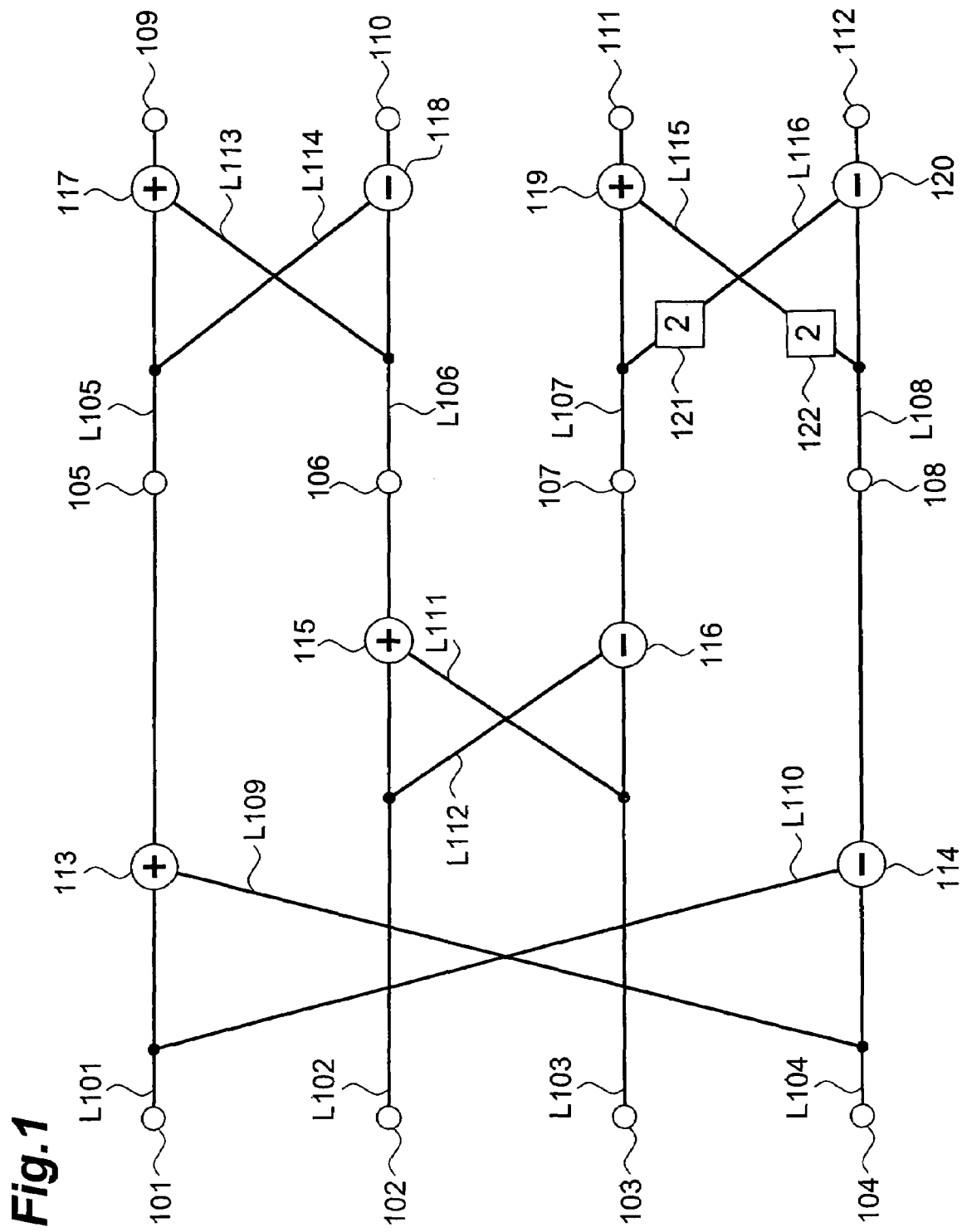
FIG. 1 is a block diagram showing a discrete cosine transform process according to the conventional technology.

The signals of intermediate values imported from connection terminals 307, 308 are also similarly processed, and coefficients of frequency components thus transformed are outputted from terminals 309-312. If the weighting factors $w_1$-$w_4$ shown in FIG. 16 all take the value of "1", the transformation is the same as that shown in FIG. 1. Namely, the image signal transforming method according to the present invention enables the signal transformation by a transformation basis suitable for signals as objects of transformation with change in the weighting factors $w_1$-$w_4$, while performing the processing according to the transformation rule in the conventional transformation method.

In the transformation module 313 of FIG. 16, the weighting factor $w_1$ in the weighting device 318A corresponds to the "n-th weighting factor" stated in Claims, and the subtraction process by subtractor 317 and the addition process by multiplier 320 and adder 321 correspond to the "first transformation arithmetic" stated in Claims. In the transformation module 314, the weighting factor $w_2$ in the weighting device 323A corresponds to the "n-th weighting factor" stated in Claims, and the subtraction process by subtractor 322 and the addition process by multiplier 325 and adder 326 correspond to the "first transformation arithmetic" stated in Claims.

In the transformation module 315, the weighting factor $w_3$ in the weighting device 329A corresponds to the "m-th weighting factor" stated in Claims, and the subtraction process by multiplier 328 and subtractor 327 and the addition process by multiplier 332 and adder 333 correspond to the "second transformation arithmetic" stated in Claims. In the transformation module 316, the weighting factor $w_4$ in the weighting device 335A corresponds to the "m-th weighting factor" stated in Claims, and the subtraction process by subtractor 334 and the addition process by multiplier 337 and adder 338 correspond to the "second transformation arithmetic" stated in Claims.

Figure 17:
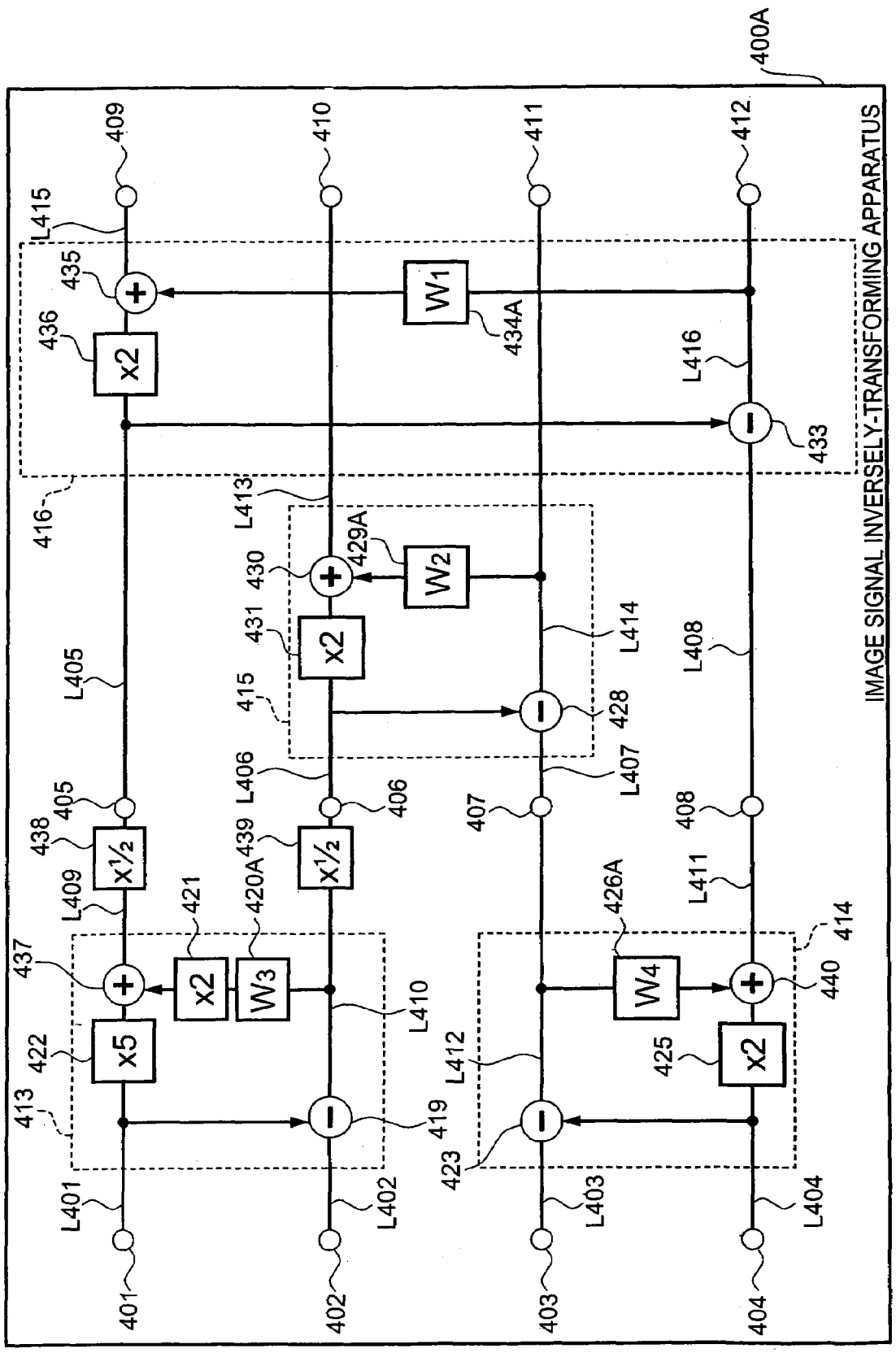
FIG. 17 is a block diagram of an image signal inversely-transforming apparatus according to the second embodiment.

Next, an inverse transformation process of an image signal will be described with reference to FIG. 17. FIG. 17 is a block diagram showing a configuration of an image signal inversely-transforming apparatus for performing an inverse transformation process corresponding to the signal transforming process by the image signal transforming apparatus 300A. The image signal inversely-transforming apparatus 400 in the present embodiment comprises input terminals 401-404, connection terminals 405-408, output terminals 409-412, subtractors 419, 423, 428, 433, adders 437, 440, 430, 435, weighting devices 420A, 426A, 429A, 434A, and multipliers 421, 425, 431, 436. These components are connected so as to be able to import and export signals from and to each other through a bus.

The image signal inversely-transforming apparatus 400 performs an inverse process to the image signal transforming apparatus 300A. The image signal inversely-transforming apparatus 400 is an apparatus for inversely transforming coefficients in the frequency domain into signals in the pixel domain and is composed of four fundamental transformation modules 413-416. As shown in FIG. 17, the image signal inversely-transforming apparatus 400 imports transformation coefficients obtained by the foregoing signal transformation process, via input terminals 401-404. The coefficient imported via input terminal 401 is subjected to an arithmetic operation (subtraction) with the coefficient imported via input terminal 402, at subtractor 419.

Figure 2:
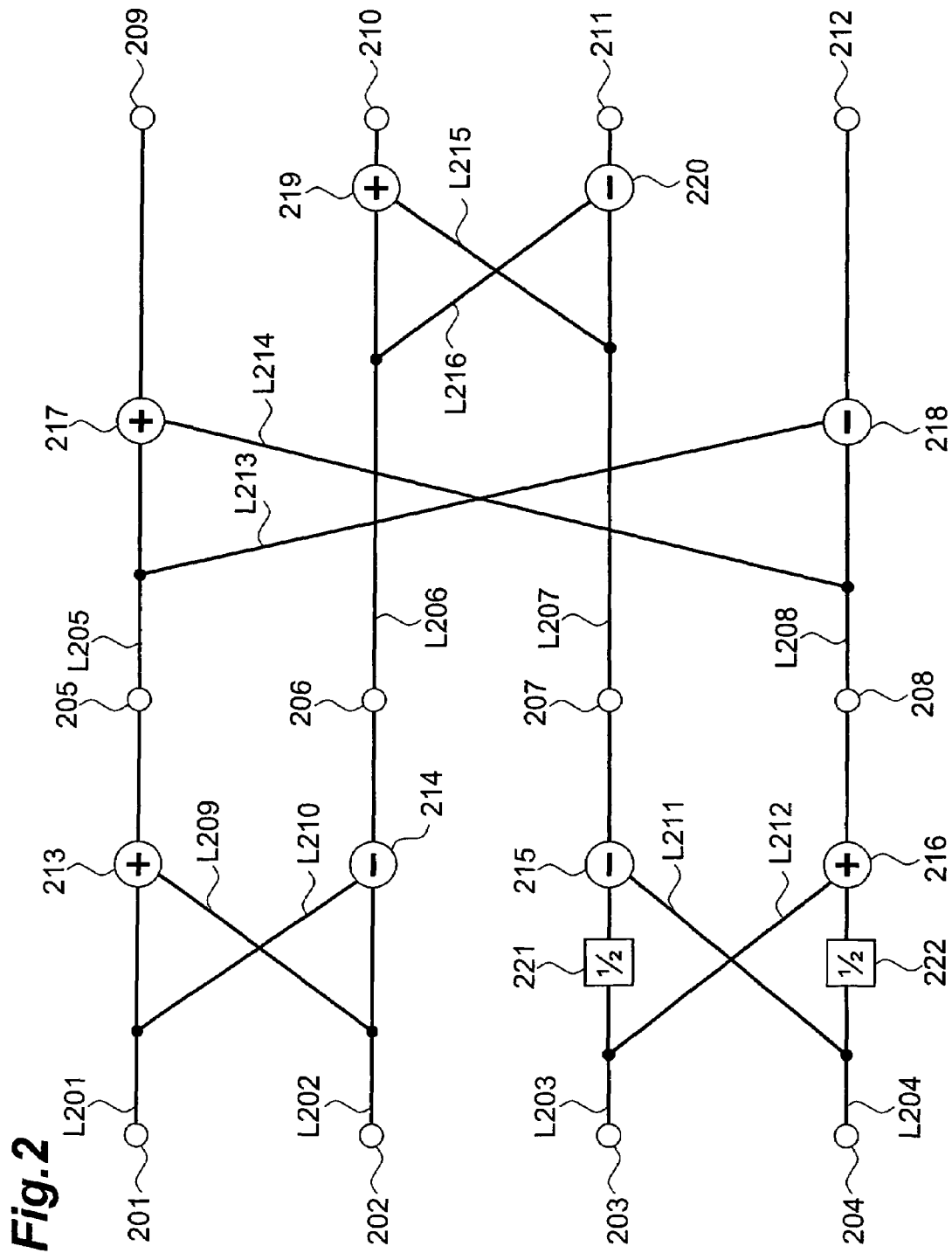
FIG. 2 is a block diagram showing an inverse discrete cosine transform process according to the conventional technology.

The arithmetic result is halved (at 439) and the result is outputted as an intermediate value to connection terminal 406. At the same time, this subtraction result is weighted by a factor $w_3$ in the weighting device 420A and the weighted result is subjected to an arithmetic operation with the input signal from input terminal 401. This arithmetic process is executed by multipliers 421, 422 and adder 437. Similarly, the transformation coefficients imported from input terminals 403, 404 are processed by transformation module 414. The intermediate values obtained are outputted to connection terminals 405-408 and thereafter inversely transformed into signals in the pixel domain by transformation modules 415, 416. The multipliers 422, 425, 431, 436 in FIG. 17 determines their multiplier coefficients so as to achieve the same magnitude as the input signals shown in FIG. 16. The weighting devices 420A, 426A, 429A, 434A in FIG. 17 correspond to the weighting devices in the transformation modules 313-316 shown in FIG. 16 and the weighting factors of the respective weighting devices are determined so that the results of the inverse transformation become identical with the signals before the transformation. If the weighting factors $w_1$-$w_4$ in FIG. 17 all take the value of "1", the inverse transformation is much the same as the inverse transformation process described with reference to FIG. 2.

In the second embodiment the transformation modules are configured to add the subtraction result, but, contrary to it, it is also possible to adopt a method of subtracting an addition result. In this case, the image signal inversely-transforming apparatus may be configured to set the multiplier coefficients so as to maintain the input energy of the transformer and the output energy of the inverse transformer. The above described the input signal of four pixels, but the input signal of N pixels (N is an arbitrary natural number) can also be processed by providing a corresponding weight, prior to the arithmetic process (addition/subtraction) in the conventional N×N DCT apparatus and IDCT apparatus, and processing resultant data.

Now, let us describe the weights used in the transformation and inverse transformation of image signal. In the second embodiment a factor to maximize the degree of energy concentration of the signal as a processing object is selected from a total of sixteen factors of 19/16, 18/16, 17/16, . . . , 5/16, and 4/16. The factors $w_1$-$w_4$ take an identical value, but different factors may also be used. Depending upon signals, $w_3$ may be fixed to "1" and the other factors may be any one of the above-described values. Alternatively, each of $w_1$-$w_3$ may be fixed to "1" and only $w_4$ may be variable. Furthermore, the factors may be those other than the aforementioned sixteen factors.

The image signal inversely-transforming apparatus 400 weights the input signals by the weighting factors $w_1$-$w_4$, whereby it substantially changes the transformation basis. Such processing will be described with reference to FIGS. 18 and 19. FIG. 18 is an illustration showing matrices for the transformation and inverse transformation in the conventional technology. Matrix 1801 is a transformation matrix, matrix 1802 an inverse transformation matrix, and matrix 1803 a normalized matrix for conservation of energy. In contrast to it, FIG. 19 is an illustration showing matrices for the transformation and inverse transformation according to the present invention. Matrix 1901 is a transformation matrix, matrix 1902 an inverse transformation matrix, and matrix 1903 a normalized matrix for conservation of energy.

By comparison between FIG. 18 and FIG. 19, $w_1$-$w_4$ change the basis of the conventional transformation or inverse transformation matrix, and if the values of $w_1$-$w_4$ all are 1, the matrices of the invention are equal to the conventional transformation and inverse transformation matrices. Namely, the image signal inversely-transforming apparatus 400 is able to adjust the transformation basis with change in the values of $w_1$-$w_4$, whereby it is able to perform the transformation suitable for signals as objects of transformation.

Subsequently, an image encoding apparatus, method, and program using the aforementioned image signal transforming process will be described. FIG. 8 is an illustration showing a configuration of image encoding apparatus 800 in the present embodiment. As shown in FIG. 8, the image encoding apparatus 800 comprises input terminal 801, block decomposer 802, intra-frame predictor 803, inter-frame predictor 804, connection terminals 805, 806, 807, 808, 810, selector switch 809, adder 811, frame memory 812, transformer 813, quantizer 814, dequantizer 815, inverse transformer 816, adder 817, weight determiner 818, entropy encoder 819, and output terminal 820. These components are connected so as to be able to import and transport signals from and to each other through a bus. The components including the intra-frame predictor 803 and inter-frame predictor 804 will be generally referred to hereinafter as prediction signal generator 821.

When a plurality of images constituting a motion picture are imported via input terminal 801, each of these images is decomposed into blocks of N×M pixels by block decomposer 802. In the present embodiment N=M=8, but N does not always have to equal M. In addition, the decomposition may be one other than 8-pixel decomposition. A block as an object for coding is fed via line L820a to the intra-frame predictor 803 and to the inter-frame predictor 804.

The intra-frame predictor 803 imports a block signal as an object for coding and a previously reconstructed image signal forming the same frame stored in frame memory 812, and generates a frame prediction signal similar to that in Standard H.264. The inter-frame predictor 804 imports the block as an object for coding and a previously reconstructed signal of a different frame stored in frame memory 812, and generates an inter-frame prediction signal by motion detection prediction similar to that in Standard H.264.

The image encoding apparatus 800 assumes a case where no input is supplied from terminal 805, or where an original signal is used directly as an object for coding. The selector switch 809 selects a mode to minimize the number of bits, out of three cases of a prediction signal by the intra-frame predictor 803, a prediction signal by the inter-frame predictor 804, and no prediction signal. The prediction signal determined as described above is fed to adder 811 and a difference is determined from a block as an object for coding. Where the selector switch 809 is connected to terminal 808, the input from terminal 805 is "0" and the output of adder 811 is nothing but the coding object block. The differential signal is outputted to the weight determiner 818.

The weight determiner 818 executes the aforementioned image signal transforming process with a plurality of weighting factors on the differential signal, and thereafter estimates the number of bits of the transformation coefficients. In the present embodiment, the weight determiner 818 determines weights to minimize the number of bits after entropy encoding of the transformation coefficients and outputs identifiers (corresponding to identification information) for identification of the weights to the transformer 813. The transformer 813 performs the transformation using the weights determined by the weight determiner 818. The transformer 813 further decompose a block of 8×8 pixels in units of 4×4 pixels, and performs the weighted transformation for each 4×4 block.

The apparatus may also be configured as follows: the process executed by the weight determiner 818 is incorporated in the transformer 813, and the transformer 813 determines the optimal weighted transformation while performing a plurality of weighted transformations, and generates the transformation coefficients. The present embodiment is arranged to perform the process of the same weighted transformation for all the four 4×4 blocks included in an 8×8 block, but the transformer 813 may be arranged to perform different weighted transformations for the respective 4×4 blocks.

The transformation coefficients obtained in this manner are fed to the quantizer 814 to be quantized. The quantized coefficients are fed to the entropy encoder 819 to be encoded by variable length coding, and thereafter the coded data is outputted from output terminal 820. On the other hand, the quantized coefficients are dequantized by the dequantizer 815 and the dequantized coefficients are inversely transformed with the weight determined by the weight determiner 818, by the inverse transformer 816. The adder 817 adds the result to the prediction signal fed via line L811, to generate a reconstructed signal. The reconstructed signal thus generated is stored in frame memory 812. The identifiers about the weighting factors determined by the weight determiner 818 are fed via line L814 to the entropy encoder 819 and thereafter they, together with the other data, are outputted from the output terminal 820.

Figure 20:
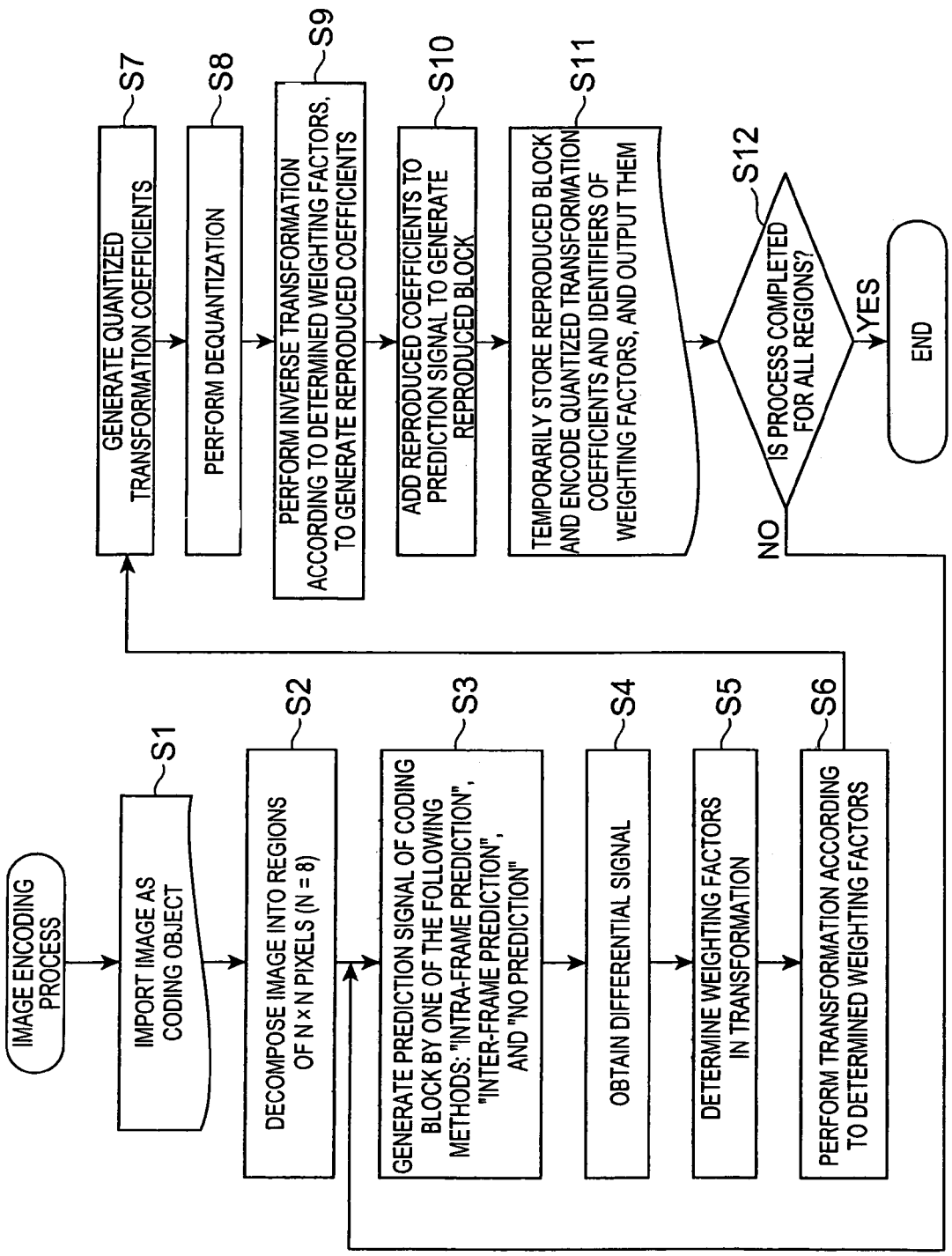
FIG. 20 is a flowchart showing an image encoding method according to the second embodiment.

The following will describe the operation of the image encoding apparatus according to the present invention with reference to FIG. 20, in conjunction with steps constituting an image encoding method. FIG. 20 is a flowchart for explaining the image encoding process executed by the image encoding apparatus 800. When an image as an object for coding is imported (S1), the image is decomposed into blocks of 8×8 pixels (S2). S3 is to generate a prediction signal for a block as an object for coding. In the present embodiment a method of generating the prediction signal is selected from the three modes of "intra-frame prediction", "inter-frame prediction" and "no prediction". The prediction signal is determined to be a signal with the least error among candidates for the prediction signal generated by these methods.

S4 is to generate a differential signal from a difference between the prediction signal and the block as an object for coding S5 is to perform the transformation process by the above method with a plurality of weighting factors on the differential signal decomposed in 4×4 sample units, and to determine weighting factors to achieve the most compact form of signals. For example, where the number of bits or image quality is enhanced, the image encoding apparatus 800 sets the weighting factors $w_1$-$w_3$ to "1" and the weighting factor $w_4$ to one of the aforementioned sixteen values. On the other hand, where the number of bits or image quality is lowered, the image encoding apparatus 800 sets the weighting factor $w_3$ to "1" and the weighting factors $w_1$, $w_2$, $w_4$ to one of the aforementioned sixteen values.

S6 is to execute the transformation process according to the weighting factors determined at S5. Thereafter, the transformation coefficients are quantized to generate quantized transformation coefficients (S7). The quantized transformation coefficients are dequantized (S8) and thereafter they are inversely transformed using the weighting factors determined at S5. As a result, reconstructed coefficients are generated (S9). S10 is to add the reconstructed coefficients thus generated, to the prediction signal determined at S3. This results in generating a reconstructed block. The reconstructed block is temporarily stored in frame memory 812. At the same time, the quantized transformation coefficients and the identifiers of the weighting factors are entropy encoded and coded data is outputted (S11).

The sequential processes of S3-S11 are executed for all the regions generated by the decomposition process at S2 (S12; NO). The image encoding process will end at the time of completion of the processing for all the regions. If the image encoding apparatus 800 is configured to output the transformation coefficients acquired in the determining process of the weighting factors for the transformation at S5, the transformation process does not have to be performed again, and the process of S6 can be omitted.

An image decoding apparatus, method, and program using the above-described image signal inversely-transforming process will be described. FIG. 11 is an illustration showing a configuration of an image decoding apparatus in the present embodiment. As shown in FIG. 11, the image decoding apparatus 1110 comprises input terminal 1100, data analyzer 1101, dequantizer 1102, inverse transformer 1103, adder 1104, prediction signal generator 1105, frame memory 1106, and output terminal 1107. These components are connected so as to be able to import and export signals from and to each other through a bus.

Imported via input terminal 1100 is compressed data generated by performing intra-frame prediction or inter-frame prediction for an image decomposed into a plurality of regions and then performing the transformation and coding. The data analyzer 1101 analyzes the compressed data and performs the entropy decoding process. It also extracts the quantized transformation coefficients, the information about quantization, the mode information about generation of the prediction signal, and the identifiers (corresponding to the identification information) of the weighting factors used in the inverse transformation process.

The dequantizer 1102 imports the quantized transformation coefficients and the information about quantization via line L1102 and generates dequantized transformation coefficients. The inverse transformer 1103 imports the dequantized transformation coefficients via line L1105 and imports the identifiers of the weighting factors to be used in the inverse transformation process, via line L1104. Then it performs the inverse transformation, using the designated weighting factors, to generate an inversely transformed signal.

The prediction signal generator 1105 imports the mode information about generation of the prediction signal via line L1103 and then selects an optimal mode from the intra-frame prediction, inter-frame prediction, and no prediction with reference to the information to generate a prediction signal. The adder 1104 adds the inversely transformed signal imported via line L1106, to the prediction signal imported via line L1107. The frame memory 1106 stores the result of the addition and the output terminal 1107 implements a display thereof.

Figure 21:
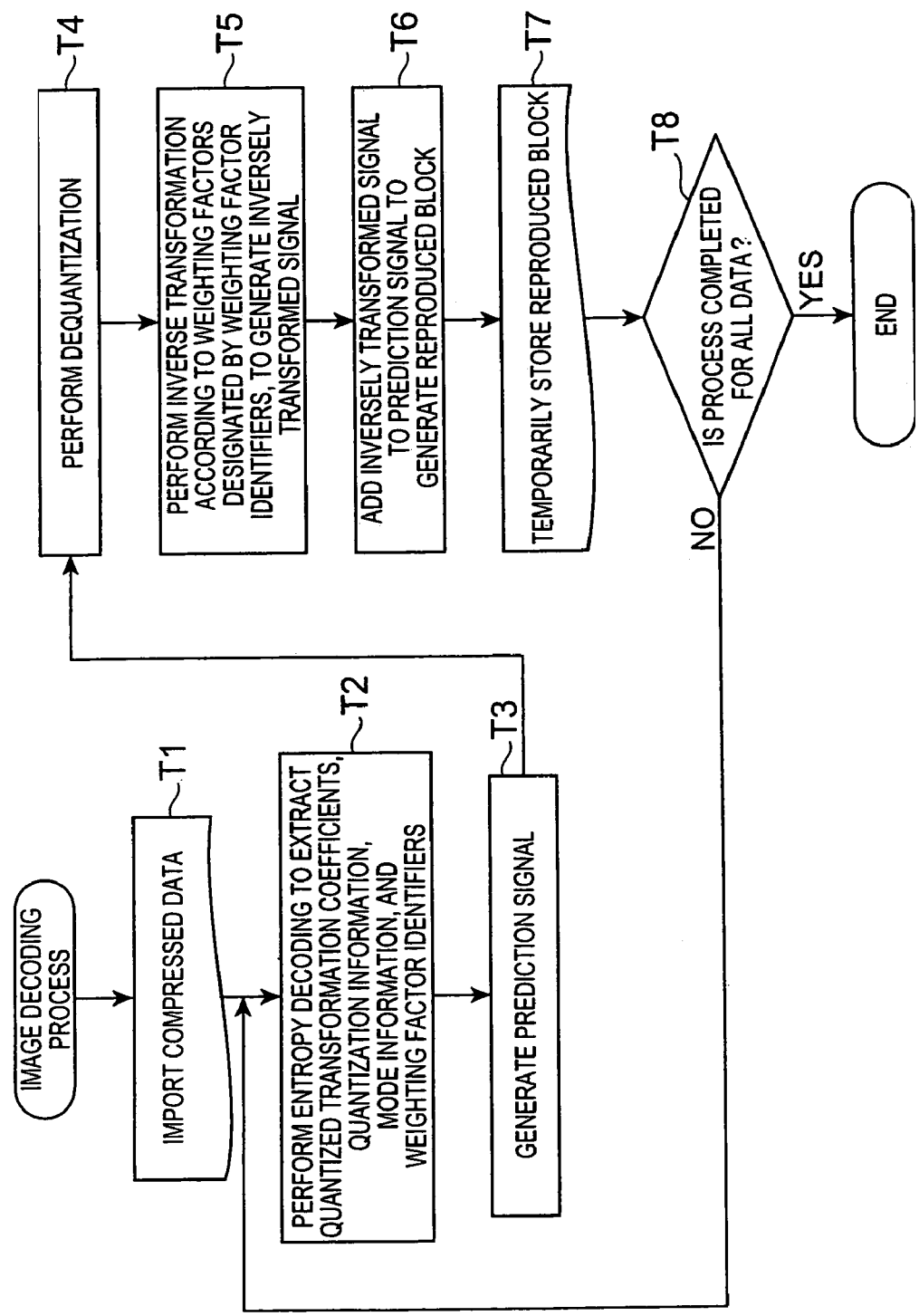
FIG. 21 is a flowchart showing an image decoding method according to the second embodiment.

The following will describe the operation of the image decoding apparatus according to the present invention with reference to FIG. 21, in conjunction with steps constituting an image decoding method. FIG. 21 is a flowchart for explaining the image decoding process executed by the image decoding apparatus 1110. When compressed data is imported (T1), entropy decoding is carried out to extract from the compressed data the quantized transformation coefficients, information about quantization, mode information about generation of the prediction signal, and the identifiers of the weighting factors (T2). T3 is to generate the prediction signal, based on the mode information about generation of the prediction signal.

T4 is to dequantize the quantized transformation coefficients and T5 is to perform the inverse transformation process according to the weighting factors designated by the weighting factor identifiers. As a result, an inversely transformed signal is generated. T6 is to add the prediction signal generated at T3, to the inversely transformed signal generated at T5, to generate a reconstructed block signal. At T7, this reconstructed block signal is temporarily stored in frame memory 1106. The sequential processes of T2-T7 are executed for all the compressed data imported at T1 (T8; NO). The image decoding process will end at the time of completion of the processing for all the data.

Figure 22:
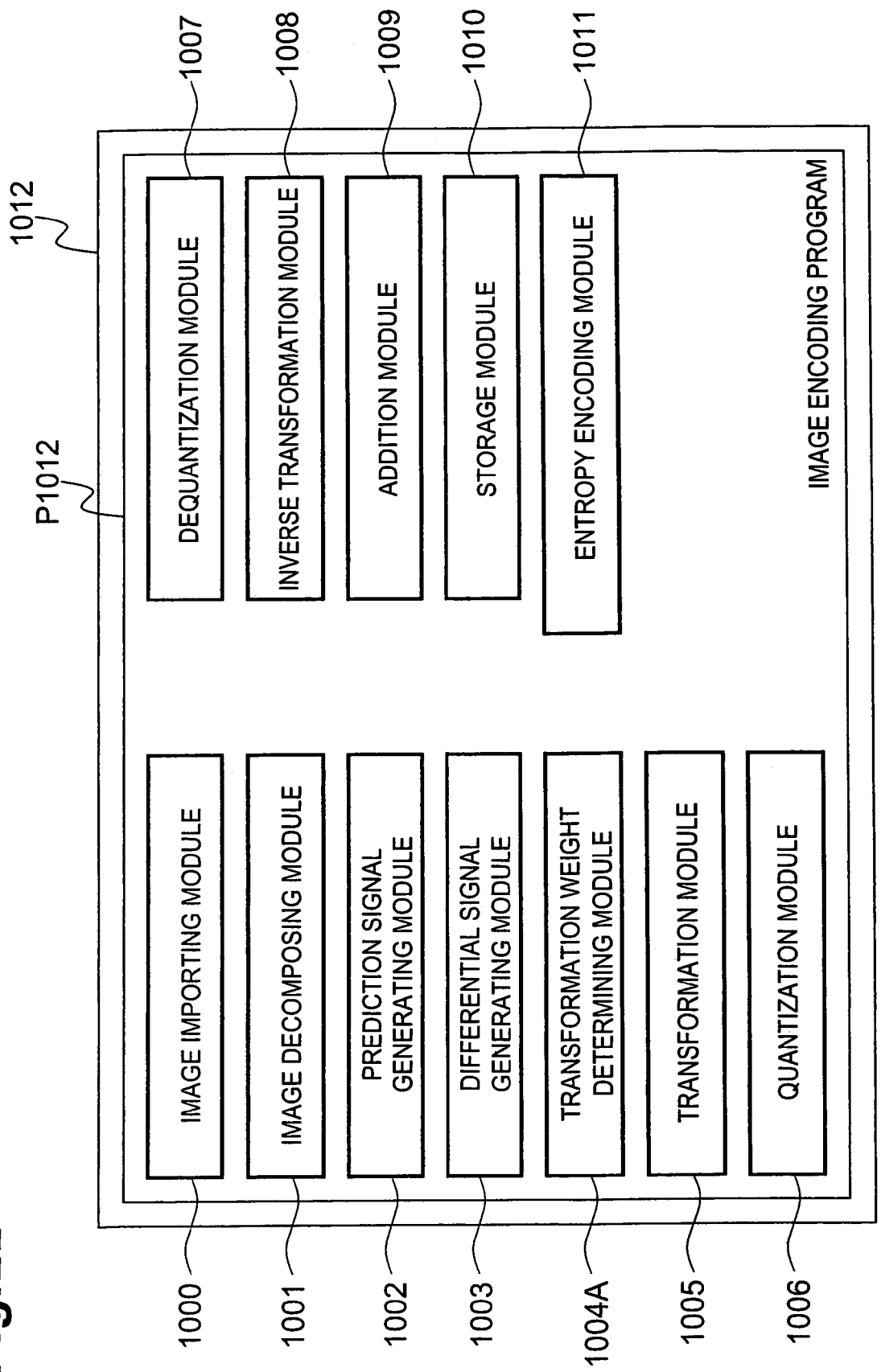
FIG. 22 is an illustration conceptually showing a configuration of an image encoding program according to the second embodiment.

The image encoding technology according to the present invention can also be implemented as an image encoding program for letting a computer operate as image encoding apparatus 800. FIG. 22 is an illustration showing a configuration of image encoding program P1012 according to the present invention. The image encoding program P1012 is recorded in recording medium 1012. The recording medium 1012 is, for example, a floppy (registered trademark) disk, a CD-ROM, a DVD (Digital Versatile Disc), or a semiconductor memory.

As shown in FIG. 22, the image encoding program P1012 includes as constituent units, image importing module 1000, image decomposing module 1001, prediction signal generating module 1002, differential signal generating module 1003, transformation weight determining module 1004A, transformation module 1005, quantization module 1006, dequantization module 1007, inverse transformation module 1008, addition module 1009, and entropy encoding module 1011. The functions realized by execution of these modules are similar to the respective functions of the input terminal 801, block decomposer 802, prediction signal generator 821, adder 811, weight determiner 818, transformer 813, quantizer 814, dequantizer 815, inverse transformer 816, adder 817, and entropy encoder 819 in the aforementioned image encoding apparatus 800 (cf. FIG. 8). The image encoding program P1012 further has storage module 1010 and data stored by execution of storage module 1010 is the same as the data stored in the frame memory 812.

The image decoding technology according to the present invention can also be implemented as an image decoding program for letting a computer operate as the image decoding apparatus 1110 shown in FIG. 11. The image decoding program P1307 according to the present invention can adopt, for example, the configuration as shown in FIG. 13. The image decoding program P1307 is recorded in recording medium 1307. The recording medium 1307 is, for example, a flexible disk, a CD-ROM, a DVD, or a semiconductor memory.

As shown in FIG. 13, the image decoding program P1307 includes as constituent units, compressed data importing module 1300, entropy decoding module 1301, prediction signal generating module 1302, dequantization module 1303, inverse transformation module 1304, and addition module 1305. The functions realized by execution of these modules are similar to the respective functions of the input terminal 1100, data analyzer 1101, prediction signal generator 1105, dequantizer 1102, inverse transformer 1103, and adder 1104 in the aforementioned image decoding apparatus 1110. The image decoding program P1307 further has storage module 1306, and data stored by execution of storage module 1306 is the same as the data stored in the frame memory 1106.

FIG. 14 is an illustration showing a hardware configuration of computer 30 for executing a program recorded in recording medium 10. The recording medium 10 corresponds to the aforementioned recording medium 1012 or 1307. As shown in FIG. 14, the computer 30 comprises data reading device 12 such as an FDD (Flexible Disk Drive), a CD-ROM drive, or a DVD drive, working memory (RAM: Random Access Memory) 14 in which an OS is resident, memory 16 for storing the program read out of the recording medium 10, display 18 as a display unit, mouse 20 and keyboard 22 as input devices, communication device 24 for transmission and reception of data, and CPU 26 for totally controlling the execution of the program.

When the recording medium 10 is set in the reading device 12, the computer 30 becomes accessible to the image encoding program or image decoding program recorded in the recording medium 10, through the reading device 12. The computer 30 lets CPU 26 execute the image encoding program, whereby it operates as the aforementioned image encoding apparatus 800. Similarly, the computer 30 lets the CPU 26 execute the image decoding program, whereby it can operate as the aforementioned image decoding apparatus 1110.

FIG. 15 is a perspective view of appearance of computer 30 for executing the program recorded in the recording medium 10. The computer 30 embraces a DVD player, a set-top box, a cell phone, etc. provided with a CPU and configured to perform information processing or control based on software, as well as a PC (Personal Computer).

As shown in FIG. 15, the image encoding program or the image decoding program may be one provided via a network (or downloaded), as data signal 40 superimposed on a carrier wave. In this case, the computer 30 receives the image encoding program or the image decoding program by communication device 24 (FIG. 14) and stores it in memory 16 (FIG. 14), and thereafter it executes these programs.

As described above, the image encoding/decoding technology (apparatus, methods, and programs) according to the second embodiment is to perform the weighted transformation process to maximize the correlation of input signals in the signal transformation process. This enables signals to be expressed in a more compact form and thus achieves efficient coding of the image signal.

The disclosure of Japanese Patent Application No. 2005-002995 filed Jan. 7, 2005 including specification, drawings and claims, and the disclosure of Japanese Patent Application No. 2005-141669 filed May 13, 2005 including specification, drawings and claims are incorporated herein by reference in its entirety.

What is claimed is:

1. An image encoding apparatus comprising:

importing means for importing an input image as an object for coding;

region decomposing means for decomposing the input image imported by the importing means, into a plurality of coding regions;

predicting means for obtaining a differential signal by either intra-frame prediction or inter-frame prediction, for each of the coding regions resulting from the decomposition by the region decomposing means, and for generating the obtained differential signal as a transformation object signal;

transforming means for generating a transformed sample, using the transformation object signal generated by the predicting means, as an input sample, based on an image signal transforming method of generating one or more transformed samples from a plurality of input samples, said transforming means including means for performing a filtering process on at least one first input sample out of a plurality of first input samples used for generation of a first transformed sample, to generate first filtered data, said transforming means includes means for performing a first arithmetic process on another first input sample not used for the generation of the first filtered data and the first filtered data generated, to generate the first transformed sample, and for defining the generated transformed sample as a transformation coefficient, thereby transforming the transformation object signal into the transformation coefficient; and encoding means for encoding the transformation coefficient obtained by the transforming means.

2. The image encoding apparatus according to claim 1, wherein the transforming means selects and uses a filter to maximize a correlation of the transformation object signal, out of plural types of filters in the filtering process, and further encodes identification information for identification of the selected filter.

3. An image decoding apparatus comprising:

importing means for importing compressed data generated by performing either intra-frame prediction or inter-frame prediction, for an image decomposed into a plurality of regions, and performing transformation and coding;

decoding means for restoring transformation coefficients corresponding to said respective regions from the compressed data imported by the importing means, and for generating the resultant transformation coefficients as restored transformation coefficients; and inversely transforming means for generating a transformed sample, using the restored transformation coefficients generated by the decoding means, as input samples, based on an image signal transforming method of generating one or more transformed samples from a plurality of input samples, said inversely transforming means including means for performing a filtering process on at least one first input sample out of a plurality of first input samples used for generation of a first transformed sample, to generate first filtered data, said inversely transforming means including means for performing a first arithmetic process on another first input sample not used for the generation of the first filtered data and the first filtered data generated, to generate the first transformed sample, and for defining the generated transformed sample as inversely transformed data, thereby transforming the restored transformation coefficients into the inversely transformed data.

4. The image decoding apparatus according to claim 3, wherein the compressed data contains filter identification information for identification of a filter used in the filtering process, and wherein the decoding means decodes the filter identification information and performs the filtering process using the filter corresponding to the decoded filter identification information.

5. An image encoding method comprising:
an importing step of importing an input image as an object for coding;
a region decomposing step of decomposing the input image imported in the importing step, into a plurality of coding regions;
a predicting step of obtaining a differential signal by either intra-frame prediction or inter-frame prediction, for each of the coding regions resulting from the decomposition in the region decomposing step, and generating the obtained differential signal as a transformation object signal;
a transforming step of generating with a processor a transformed sample, using the transformation object signal generated in the predicting step, as an input sample, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data and the first filtered data generated, to generate the first transformed sample, and defining the generated transformed sample as a transformation coefficient, thereby transforming the transformation object signal into the transformation coefficient; and
an encoding step of encoding the transformation coefficient obtained in the transforming step.

6. An image decoding method comprising:
an importing step of importing compressed data generated by performing either intra-frame prediction or inter-frame prediction, for an image decomposed into a plurality of regions, and performing transformation and coding;
a decoding step of restoring transformation coefficients corresponding to said respective regions from the compressed data imported in the importing step, and generating the resultant transformation coefficients as restored transformation coefficients; and
an inversely transforming step of generating with a processor a transformed sample, using the restored transformation coefficients generated in the decoding step, as input samples, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data and the first filtered data generated, to generate the first transformed sample, and defining the generated transformed sample as inversely transformed data, thereby transforming the restored transformation coefficients into the inversely transformed data.

7. A computer readable recording medium having image encoding program instructions that when executed by a computer execute the following steps:
an importing step of importing an input image as an object for coding;
a region decomposing step of decomposing the input image imported in the importing step, into a plurality of coding regions;
a predicting step of obtaining a differential signal by either intra-frame prediction or inter-frame prediction, for each of the coding regions resulting from the decomposition in the region decomposing step, and generating the obtained differential signal as a transformation object signal;
a transforming step of generating a transformed sample, using the transformation object signal generated in the predicting step, as an input sample, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data and the first filtered data generated, to generate the first transformed sample, and defining the generated transformed sample as a transformation coefficient, thereby transforming the transformation object signal into the transformation coefficient; and
an encoding step of encoding the transformation coefficient obtained in the transforming step.

8. A computer readable recording medium having image decoding program instructions that when executed by a computer execute the following steps:
an importing step of importing compressed data generated by performing either intra-frame prediction or inter-frame prediction, for an image decomposed into a plurality of regions, and performing transformation and coding;
a decoding step of restoring transformation coefficients corresponding to said respective regions from the compressed data imported in the importing step, and generating the resultant transformation coefficients as restored transformation coefficients; and
an inversely transforming step of generating a transformed sample, using the restored transformation coefficients generated in the decoding step, as input samples, based on an image signal transforming method of generating one or more transformed samples from a plurality of input samples, which comprises a first transformed sample generating step of performing a filtering process on at least one first input sample out of a plurality of first input samples used for generation of a first transformed sample, to generate first filtered data, and performing a first arithmetic process on another first input sample not used for the generation of the first filtered data and the first filtered data generated, to generate the first transformed sample, and defining the generated transformed sample as inversely transformed data, thereby transforming the restored transformation coefficients into the inversely transformed data.

9. An image encoding apparatus comprising:
importing means for importing an input image as an object for coding;
region decomposing means for decomposing the input image imported by the importing means, into a plurality of coding regions;
predicting means for obtaining a differential signal by either intra-frame prediction or inter-frame prediction, for each of the coding regions resulting from the decomposition by the region decomposing means, and for generating the differential signal as a transformation object signal;

transforming means for generating a transformed sample, using the transformation object signal generated by the predicting means, as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples, and for defining the generated transformed sample as a transformation coefficient, thereby transforming the transformation object signal into the transformation coefficient; and encoding means for encoding the transformation coefficient obtained by the transforming means.

10. The image encoding apparatus according to claim 9, wherein the transforming means selects a weighting factor to maximize a degree of energy concentration of the transformation object signal, out of a plurality of weighting factors in the intermediate value generating step and in the transformation coefficient generating step, and wherein identification information of the weighting factor is further encoded.

11. An image decoding apparatus comprising:
importing means for importing compressed data generated by performing either intra-frame prediction or inter-frame prediction, for an image decomposed into a plurality of regions, and for performing transformation and coding;
decoding means for restoring transformation coefficients corresponding to the respective regions from the compressed data imported by the importing means, and for generating the resultant transformation coefficients as restored transformation coefficients; and
inversely transforming means for generating an output sample, using the restored transformation coefficients generated by the decoding means, as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and for defining the output sample as inversely transformed data, thereby transforming the restored transformation coefficients into the inversely transformed data.

12. The image decoding apparatus according to claim 11, wherein the compressed data contains identification information of the weighting factor used in the intermediate value generating step or in the output value generating step, and
wherein the decoding means decodes the identification information and performs the process of the intermediate value generating step or the output value generating step, using the weighting factor corresponding to the identification information.

13. An image encoding method comprising:
an importing step of importing an input image as an object for coding;
a region decomposing step of decomposing the input image imported in the importing step, into a plurality of coding regions;
a predicting step of obtaining a differential signal by either intra-frame prediction or inter-frame prediction, for each of the coding regions resulting from the decomposition in the region decomposing step, and generating the differential signal as a transformation object signal;
a transforming step of generating a transformed sample, using the transformation object signal generated in the predicting step, as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples, and defining the generated transformed sample as a transformation coefficient, thereby transforming the transformation object signal into the transformation coefficient; and
an encoding step of encoding the transformation coefficient obtained in the transforming step.

14. The method of claim 13, wherein said transformation step includes generating the transformed sample by using a processor programmed to implement said transforming method.

15. An image decoding method comprising:
an importing step of importing compressed data generated by performing either intra-frame prediction or inter-frame prediction, for an image decomposed into a plurality of regions, and performing transformation and coding;
a decoding step of restoring transformation coefficients corresponding to the respective regions from the compressed data imported in the importing step, and generating the resultant transformation coefficients as restored transformation coefficients; and
an inversely transforming step of generating an output sample, using the restored transformation coefficients generated in the decoding step, as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and defining the output sample as inversely transformed data, thereby transforming the restored transformation coefficients into the inversely transformed data.

16. The method of claim 15, wherein said inversely-transforming step includes generating the output sample by using a processor programmed to implement said inversely-transforming method.

17. A computer readable recording medium having image encoding program instructions that when executed by a computer execute the following processes:
- a process of importing an input image as an object for coding;
- a process of decomposing the input image imported, into a plurality of coding regions;
- a process of obtaining a differential signal by either intra-frame prediction or inter-frame prediction, for each of the coding regions resulting from the decomposition, and generating the differential signal as a transformation object signal;
- a process of generating a transformed sample, using the generated transformation object signal as an input sample, based on an image signal transforming method of generating $2^N$ transformed samples from $2^N$ (N is a natural number) input samples in accordance with a predetermined transformation rule, which comprises: an intermediate value generating step of weighting one input sample out of an n-th pair ($1 \leq n \leq 2^{N-1}$, n is a natural number) of input samples determined in accordance with the transformation rule, by an n-th weighting factor, and performing a first transformation arithmetic to generate an n-th pair of intermediate values; and a transformation coefficient generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of transformed samples, and defining the generated transformed sample as a transformation coefficient, thereby transforming the transformation object signal into the transformation coefficient; and
- a process of encoding the transformation coefficient obtained.

18. A computer readable recording medium having image decoding program instructions that when executed by a computer execute the following processes:
- a process of importing compressed data generated by performing either intra-frame prediction or inter-frame prediction, for an image decomposed into a plurality of regions, and performing transformation and coding;
- a process of restoring transformation coefficients corresponding to the respective regions from the compressed data imported, and generating the resultant transformation coefficients as restored transformation coefficients; and
- a process of generating an output sample, using the restored transformation coefficients as transformed samples, based on an image signal inversely-transforming method of generating $2^N$ output samples from $2^N$ (N is a natural number) transformed samples in accordance with a predetermined transformation rule, which comprises: an intermediate value generating step of weighting one transformed sample out of an n-th pair ($1 \leq n \leq 2^{N-1}$, n is a natural number) of transformed samples determined in accordance with the transformation rule, by an n-th weighting factor, and performing a first transformation arithmetic to generate an n-th pair of intermediate values; and an output value generating step of importing $2^N$ intermediate values generated in the intermediate value generating step, weighting one intermediate value out of an m-th pair ($1 \leq m \leq 2^{N-1}$, m is a natural number) of intermediate values determined in accordance with the transformation rule, by an m-th weighting factor, and performing a second transformation arithmetic to generate an m-th pair of output samples, and defining the output sample as inversely transformed data, thereby transforming the restored transformation coefficients into the inversely transformed data.

19. An imaging coding apparatus comprising:
- an input port configured to receive an input image as an object for coding;
- an image decomposition mechanism having a processor configured to decompose the input image into a plurality of coding regions;
- a prediction mechanism configured to obtain a differential signal by either intra-frame prediction or inter-frame prediction for each of the plurality of coding regions and produce the differential signal as a transformation object signal;
- a transformation mechanism configured to generate a transformed sample, using the transformation object signal based on an image signal transforming process that generates one or more transformed samples from a plurality of input samples, said image signal said transformation mechanism being configured to filter at least one input sample out of a plurality of first input samples used for generation of a first transformed sample to generate first filtered data, said transformation mechanism including an arithmetic processor configured to perform an arithmetic process on another first input sample not used for the generation of the first filtered data and the first filter data so as to generate the first transformed sample as a transformation coefficient; and
- an encoder configured to encode the transformation coefficient.

* * * * *

UNITED STATES PATENT AND TRADEMARK OFFICE
CERTIFICATE OF CORRECTION

PATENT NO. : 7,634,148 B2 Page 1 of 1
APPLICATION NO. : 11/317014
DATED : December 15, 2009
INVENTOR(S) : Boon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 910 days.

Signed and Sealed this

Twenty-first Day of December, 2010

David J. Kappos
*Director of the United States Patent and Trademark Office*